United States Patent [19]
Sekine et al.

[11] Patent Number: 5,949,481
[45] Date of Patent: Sep. 7, 1999

[54] IMAGE SENSING AND PROCESSING DEVICE

[75] Inventors: Masayoshi Sekine, Tokyo; Masamichi Toyama, Kanagawa-ken, both of Japan

[73] Assignee: Canon Kabushiki Kaisha, Tokyo, Japan

[21] Appl. No.: 08/813,141

[22] Filed: Mar. 7, 1997

Related U.S. Application Data

[63] Continuation of application No. 08/434,793, May 4, 1995, which is a continuation of application No. 08/152,244, Nov. 12, 1993, abandoned, which is a continuation of application No. 08/028,729, Mar. 8, 1993, abandoned, which is a continuation of application No. 07/919,626, Jul. 23, 1992, abandoned, which is a continuation of application No. 07/425,477, Oct. 23, 1989, abandoned.

[30] Foreign Application Priority Data

Oct. 27, 1988 [JP] Japan .................................. 63-269554
Oct. 27, 1988 [JP] Japan .................................. 63-269557
Feb. 6, 1989 [JP] Japan .................................. 1-027038

[51] Int. Cl.$^6$ .................................................. G03B 7/08
[52] U.S. Cl. ........................ 348/208; 348/352; 345/430; 359/554
[58] Field of Search ................................. 345/208, 201, 345/169, 352, 357, 345, 364, 302, 431, 331; 354/430; 359/551

[56] References Cited

U.S. PATENT DOCUMENTS

| | | | |
|---|---|---|---|
| 4,264,161 | 4/1981 | Hosoe et al. | 354/31 |
| 4,320,948 | 3/1982 | Hosoe et al. | 354/31 |
| 4,405,940 | 9/1983 | Woolfson et al. | 358/93 |
| 4,476,494 | 10/1984 | Tugayé | 358/222 |
| 4,636,862 | 1/1987 | Hatori et al. | 358/166 |
| 4,769,826 | 9/1988 | Kubo et al. | 375/122 |
| 4,780,739 | 10/1988 | Kawakami et al. | 354/430 |
| 4,788,596 | 11/1988 | Kawakami et al. | 358/222 |
| 4,864,398 | 9/1989 | Avis et al. | 358/140 |
| 4,872,058 | 10/1989 | Baba et al. | 358/227 |
| 4,927,250 | 5/1990 | Suda | 350/500 |
| 5,012,270 | 4/1991 | Sekine et al. | 354/430 |
| 5,053,875 | 10/1991 | Ishii et al. | 358/222 |
| 5,107,293 | 4/1992 | Sekine et al. | 354/430 |

Primary Examiner—Nathan Flynn
Attorney, Agent, or Firm—Robin, Blecker & Daley

[57] ABSTRACT

In an image sensing an processing device, a movement vector of an image is detected in each of detection blocks formed by dividing an image sensing plane, and a distributed state of the image movement within the image sensing plane is detected by statistically processing the movement vector detected in each of the detection blocks. On the basis of the distributed state of the image movement, an area having an image of a main photographed object is detected so as to set a focus detecting area on the image sensing plane or to control a focusing circuit.

67 Claims, 11 Drawing Sheets

IMAGE SENSING AND PROCESSING DEVICE

This is a continuation application under 37 CFR 1.62 of prior application Ser. No. 08/434,793, filed May 4, 1995 which is a continuation of Ser. No. 08/152,244, filed Nov. 12, 1993 (abandoned), which is a continuation of Ser. No. 08/028,729, filed Mar. 8, 1993 (abandoned), which is a continuation of Ser. No. 07/919,626, filed Jul. 23, 1992 (abandoned), which is a continuation of Ser. No. 07/425,477, filed Oct. 23, 1989 (abandoned).

BACKGROUND OF THE INVENTION

1. Field of the Invention

This invention relates to an image sensing and processing device which is highly suited for a video camera or the like and is arranged to detect a moving part of an image plane, to set an object tracing area and a distance measuring area and to perform automatic focusing and automatic image stabilization control.

2. Description of the Related Art

In the image sensing optical apparatuses of varied kinds including video cameras, etc., irrespective as to whether they are adapted for industrial instrumentation, or consumer appliances, shaking of an image not only hinders easy image sighting but also degrades image recognizing accuracy. In the case of the video camera, for example, the camera is often operated while the operator is walking or while the camera is on a moving vehicle. In such a case, it is inevitable to have a sensed image shaken by a shake of the camera according to the photographing conditions or the object to be photographed.

To solve this problem, there have been proposed image shake detecting devices adopting varied methods. In one of such methods, the movement of the camera is physically detected by means of an acceleration sensor (an angular velocity sensor) and an optical system is compensated for the movement according to the direction and the degree of the movement. In another conceivable method, the parallel moving extent of the whole image plane is detected through a video signal and is expressed in a movement vector. Then, the optical system is compensated on the basis of the vector.

In accordance with the method of using the acceleration sensor, the size of the device becomes larger thus requiring increases in space and weight. Besides, it results in a complex structural arrangement. This method is therefore hardly suited for a home video camera such as a camera-incorporating type video tape recorder which must be compact in size and light in weight.

As regards the method of computing and obtaining the movement vector of the image plane from the video signal, some camera movement that is intentionally caused by the operator might be mistakenly detected for a shake of the image. The device also would respond to a movement of the object which is in reality not a shake of the image. That method thus also has a serious problem.

The above-stated known image shake detecting devices include, for example, an image stabilizing camera which is disclosed in Japanese Laid-Open Patent Application No. SHO 61-248681. The camera of this kind is arranged as follows: an optical image is converted into an electrical signal by means of an image sensing system which consists of a lens system and a photo-electric converting element. A TV image signal is obtained through a signal processing operation performed in a given manner on the electrical signal by a signal processing circuit. The image signal thus obtained is supplied to an image shake detecting circuit as well as to a monitor. A correlation between two image planes obtained at a given time interval is detected from the image signal to find the degree and the direction of any image shake. Then, a driving control circuit and a motor are operated to control and move the lens system to offset the image shaking on the basis of the result of detection. The camera is thus arranged to be capable of obtaining a stable image even when the camera shakes.

The term "image stabilization" as used herein means a camera shake correcting function. The term "tracing" as used herein means a moving object tracing function of the camera. The processing and control operations are performed for these functions fundamentally in the same manner as mentioned in the foregoing.

However, the image shake detecting device which is arranged in this manner is incapable of making a discrimination between the movement of an object occurring only in a part of the image plane and a shake of the whole image plane. To solve this problem, the image shake detecting sensitivity of the device must be arranged to vary for the different areas of the image plane.

In detecting the quantity of shake from an image, the adoption of the method of detecting the quantity of shake with uniform sensitivity for the whole image plane does not permit a discrimination between a deformation or movement of the object and tilting of the camera by hand vibrations. In accordance with that method, the camera might trace a wrong object to take a picture of it against the intention of the photographer.

In connection with this problem, an image shake detecting device has been proposed as disclosed in an article entitled "About an Image Plane Shake Compensating Device", appeared in "The Technical Report" of the Television Society, Vol. 11, No. 3, pp. 43 to 48, PPOE, '87-12 (May, 1987). In the case of that device, the whole image plane is divided into 140 blocks of areas. A shake detection switch is arbitrarily turned on or off for each of these areas and an image shake is detected only from the areas for which the shake detection switch is turned on in accordance with a representing point matching method.

In accordance with the arrangement of this image shake detecting device, however, an image to be used as reference must be temporarily stored at a frame memory with its varied density values kept intact. To meet this requirement, the device necessitates the use of an analog-to-digital (hereinafter referred to as A/D) converter and a memory of a relatively large capacity. In addition to this shortcoming, the device is arranged to have one image plane superimposed on another by staggering them to a certain degree of vector and to find out a vector that gives the highest degree of coincidence. Therefore, the operation of the device includes a large amount of computation. The device thus necessitates a circuit arrangement on a large scale and requires a long computing time.

Besides, it has been extremely difficult to have the image shake detecting device incorporated in a compact video camera which must be capable of carrying out real-time processing and must be arranged in a compact circuit arrangement, because, the above-stated device of the prior art necessitates the use of a large circuit arrangement including the A/D converter, the frame memory, a computing circuit, etc., and a long processing time.

An image shake detecting area has been determined by the following methods: (1) A method of using a difference in luminance between the background and the object and (2) a method of detecting a movement occurring area from a difference occurring between the image of one frame and that of another obtained during a given period of time. However, in accordance with these methods, it is hardly possible to accurately determine the area in cases where there is no distinct difference in luminance between the background and the object (with the method (1)) and where a plurality of objects have moved (with the method (2)). In other words, each of the conventional methods has a demerit as well as a merit. Therefore, with the conventional image shake detecting device incorporated in a compact video camera, it does not enable the camera to accurately cope with every one of varied image conditions.

As regards the automatic focusing device for a video camera or the like, various automatic focusing devices of the type using the image signal of the video camera have been proposed. It is a feature of this type that an image sensor serves also as a sensor for automatic focusing. However, the following problem arises when the distance measuring area is broadened over the whole image plane: in cases where, for example, one object located at a far distance and another object located at a near distance coexist within one and the same image plane, the lens might be focused on one of them that has a stronger signal than the other even though the lens is intended to be focused on the other object. This is known as a "far-near competing condition". To avoid this, it has been practiced to limit the distance measuring area to a size about one quarter of the whole image plane and to have it always located in the center of the image plane, because of a high probability of having a desired (or main) object in the center of the image plane.

However, if the size of the distance measuring area is arranged to be unvarying, the image of the object might become too large or too small relative to the image plane. As a solution of this problem, there has been proposed a video camera that is arranged to have one of two or three different sizes of the distance measuring area manually selectable. Despite such arrangement, however, the possibility of an inappropriate size of the area still remains. The so-called "far-near competing condition" would take place if the area is too large. If the distance measuring area is too small, the main object tends to come out of the area to cause the camera focused on the background instead of the object when either the object is moving or the camera is shaking. Therefore, this problem also still remains to be solved.

Further, there has been proposed an apparatus which uses an image shake detecting device for objects appearing within an image plane and is arranged to trace (track) a moving object and to continuously perform control for accurate automatic focusing and accurate automatic exposure control. For example, apparatuses of this kind have been disclosed in U.S. patent applications Ser. Nos. 737,163 filed on May 23, 1985; 106,427 filed on Oct. 8, 1987; 154,078 filed on Feb. 9, 1988; 237,511 filed on Aug. 26, 1988; 240,915 filed on Sep. 6, 1988; 258,692 filed on Oct. 17, 1988; and 264,204 filed on Oct. 28, 1988. However, as mentioned in the foregoing, it is difficult to accurately make a discrimination between the movement of only one object in a part of the image plane and the movement of the whole image plane due to the movement of the camera. In accordance with the above-stated method disclosed in Japanese Laid-Open Patent Application No. SHO 61-248681, the degree of accuracy would lower if there is no luminance difference because the method utilizes a difference in luminance between the background and the object to be photographed. Further, in accordance with the technique disclosed in the above-stated Technical Report of the Television Society, it becomes difficult to accurately determine the areas in a case where a plurality of objects come to move. In other words, each of the methods of the prior art has a disadvantage as well as an advantage. Therefore, with the prior art image shake detecting devices incorporated in a compact video camera in accordance with these methods, they are incapable of adequately coping with all image condition.

With respect to the image shake detecting device of this kind, further examples have been disclosed in U.S. patent application Ser. No. 855,732 filed on Apr. 25, 1986, U.S. patent application Ser. No. 880,152 filed on Jun. 30;, 1986, etc. These patent applications disclose an image stabilizing camera which is arranged to compensate the optical axis of the lens system by detecting an image shake through the edge component of the image of an object to be photographed; and an arrangement to recognize an image through a histogram which represents the distribution of the feature of the image.

SUMMARY OF THE INVENTION

This invention is directed to the solution of the above-stated problems of the prior art. It is a first object of the invention to provide an image shake detecting device which is capable of accurately and stably detecting shaking of an image plane without mistaking a movement of an image resulting from shaking of the camera for an image movement resulting from a movement of a photographing object or from a panning movement of the camera or the like.

It is another object of the invention to provide an image shake detecting device for a camera which is arranged to detect a shaking state of either the image of a main object to be photographed or that of the background, whichever suits better to the state of the object, so that shake compensation can be most oppositely made under all conditions including such cases where a picture of a moving object is to be taken with the camera fixed or with the camera moved to trace (track) the moving object.

It is a further object of the invention to provide an image shake detecting device which is simple in structural arrangement and excels in responsivity without necessitating the use of any special sensor.

It is an object of the invention to provide an image processing device which is capable of accurately determining an object tracing area by statistically processing movement vectors obtained at a plurality of parts of an image plane.

It is another object of the invention to provide an image processing device which determines an object tracing area so that an object desired by the photographer to be stably positioned within an image plane can be automatically discriminated from other objects and is arranged to accurately operate even in cases where there is no distinct difference in luminance between these objects or where there are a plurality of moving objects.

To attain the above-stated object, an image processing device arranged according to this invention as a preferred embodiment thereof comprises movement vector detecting means for detecting a movement vector of an image in each of detection blocks formed by dividing an image sensing plane; computing means for detecting a distributed state of an image movement within the image sensing plane by statistically processing the movement vector obtained from each of the detection blocks; and area discriminating means for detecting an area having an image of a main photographed object on the basis of an output of the computing means.

It is a further object of the invention to provide a distance measuring area setting device which is capable of accurately and most appositely setting a distance measuring area by making a discrimination between the object and background portions of an image plane on the basis of the optical flow of movement vectors.

It is a further object of the invention to provide an automatic focusing device which is capable of setting the size, shape and position of a distance measuring area on the basis of image movement vectors obtained on the image plane and according to the state of the object to be photographed without causing such problems as the so-called far-near competing condition", etc.

It is a further object of the invention to provide an automatic focusing device which is capable of causing a focusing action and an image shake compensating action to be simultaneously carried out in most opposite manners respectively.

To attain the above-stated objects, a distance measuring area setting device arranged according to this invention as a preferred embodiment thereof comprises movement vector detecting means for detecting a movement vector of an image in each of detection blocks formed by dividing an image sensing plane; computing means for detecting a distributed state of an image movement within the image sensing plane by statistically processing the movement vector obtained from each of the detection blocks; area discriminating means for detecting an area having an image of a main photographed object on the basis of an output of the computing means; and setting means for setting a focus detecting area on the image sensing plane on the basis of the area detected by said area discriminating means.

It is a further object of the invention to provide an automatic focusing device which is capable of oppositely carrying out an automatic focusing action by detecting a panning movement of the camera from the movement vectors of images.

It is an object of the invention to provide an automatic focusing device which is capable of controlling a focus adjusting device on the basis of an optical flow of a plurality of movement vectors on an image plane.

It is another object of the invention to provide an automatic focusing device which is arranged to obtain the optical flow of an image plane by detecting movement vectors obtained within a plurality of blocks set on an image sensing plane, to detect a movement of a photographed object on the basis of displacement of the optical flow, to accurately determine whether the object is approaching to or moving away from a lens and to decide the restart of an automatic focusing action on the lens according to information on the result of the determination.

To attain the above-stated object, an automatic focusing device arranged as a preferred embodiment of the invention comprises focus detecting means for detecting a degree of focusing on an object in an image sensing plane to make focus adjustment; movement vector detecting means for detecting a movement vector of an image in each of detection blocks formed by dividing the image sensing plane; area detecting means for detecting an area having an image of the object by computing the movement vectors in the detection blocks; and control means for detecting a movement quantity of the image of the object on the basis of the movement vectors in the focus detection area detected by the area detecting means and for controlling the focus detecting means on the basis of the movement quantity.

Other objects and features of the invention will become apparent from the following detailed description of embodiments thereof taken in connection with the accompanying drawings.

DETAILED DESCRIPTION OF THE PREFERRED EMBODIMENTS

The details of the automatic focusing device arranged according to this invention will more fully appear from the description of embodiments given below with reference to the accompanying drawings:

FIGS. 1 to 3(c) show a first embodiment of this invention. In this case, the image shake detecting device arranged according to the invention is applied to an automatic tracing (tracing) type focusing device, automatic tracing type exposure control device, etc., for the purpose of setting, within an image plane, a tracing area for tracing a movement of an object occurring within the image plane.

Figure 1:
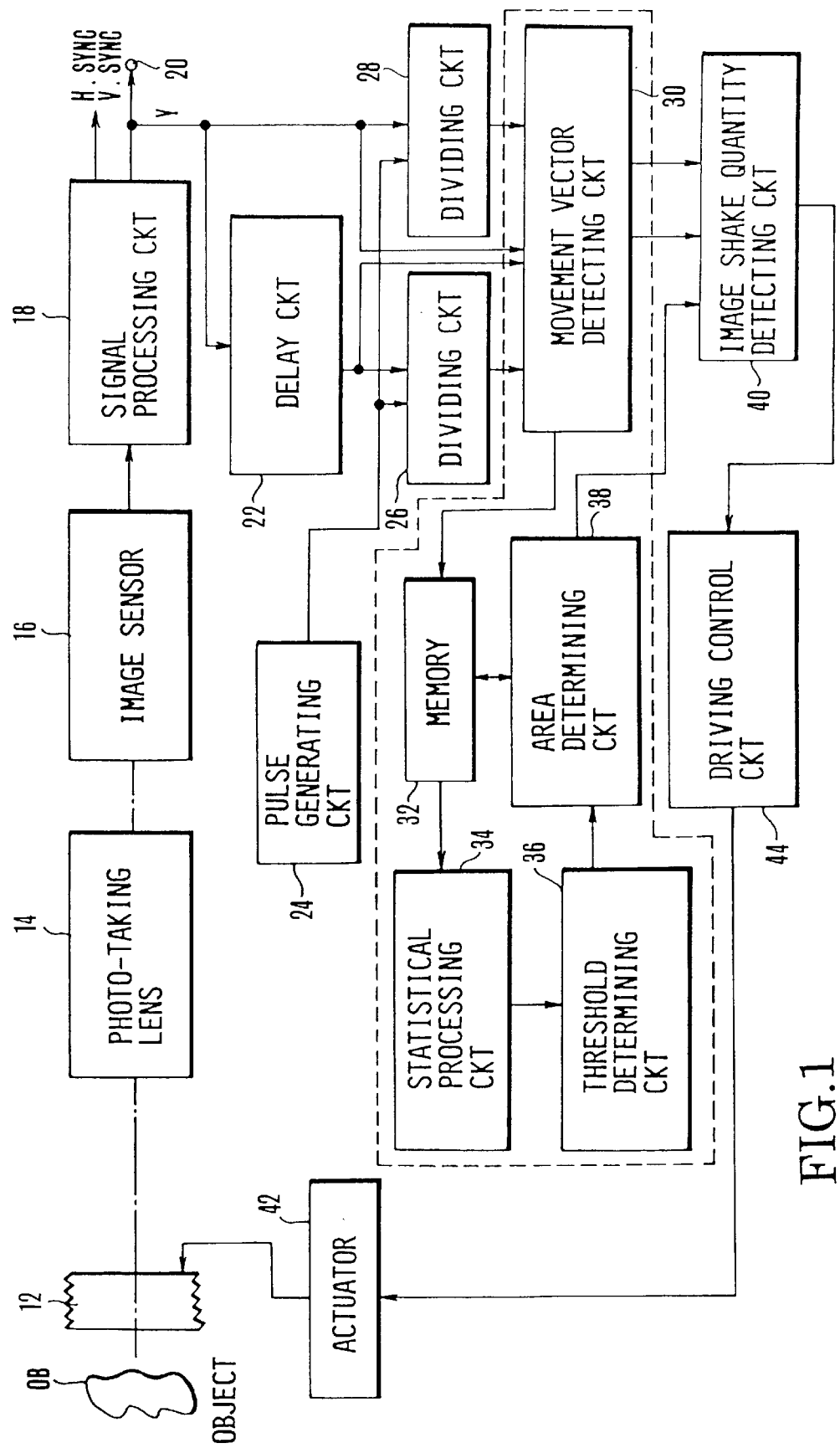
FIG. 1 is a block diagram showing the arrangement of a video camera to which the invention is applied as a first embodiment thereof.

The first embodiment is arranged to obtain movement vectors from a plurality of areas set within the image plane. An optical flow is statistically processed to determine an object tracing area and an image shake detection area. The details of the embodiment are as described below with reference to the drawings:

FIG. 1 is a block diagram showing the arrangement of a video camera which is provided with the image shake compensating device arranged according to this invention. The illustration includes an object OB; a variable apex-angle prism 12 which has a variable optical axis; a photo-taking lens 14; an image sensor 16 which is, for example, composed of a two dimensional CCD; a signal processing circuit 18 which performs a signal processing operation on an image signal output from the image sensor 16, including processes of gamma correction, blanking and addition of synchronizing signals, so that a TV signal of, for example, the NTSC system can be output from an output terminal 20; a luminance signal Y; a horizontal synchronizing signal H.SYNC; a vertical synchronizing signal V.SYNC; a delay circuit 22 which is arranged to delay the luminance signal Y for a given period of time and is composed of, for example, a field memory of the FIFO (first-in/first-out) type; a block dividing pulse generating circuit 24 which is arranged to generate a gate pulse signal for gating the video signal under a scanning process in such a way as to divide it into a given number of blocks set on the image plane; and dividing circuits 26 and 28 which divide the luminance signal Y by gating it according to the pulses output from the block dividing pulse generating circuit 24. The dividing circuits 26 and 28 are arranged to output the input luminance signal in units of the blocks set on the image plane. More specifically, each of them consists of a gate circuit which is arranged to be opened and closed by the pulses output from the block dividing pulse generating circuit 24 and a memory which is arranged to store signal parts allowed to pass through the gate circuit.

Referring further to FIG. 1, a movement vector detecting circuit 30 is arranged to compare the signal of the currently obtained image plane with the signal output from the delay circuit 22 thus representing a previous image plane which precedes the current image plane by a given period of time; and to obtain a movement vector by detecting any change occurring in each of the divided blocks. A memory 32 is arranged to store the movement vector information for each part of the image plane. A statistical processing circuit 34 is arranged to prepare a histogram indicating the size and frequency of each movement vector. A threshold determining circuit 36 is arranged to recognize the shape of the histogram and to determine a threshold value which will be described later. An area determining circuit 38 is arranged to look up and find from the histogram the blocks which are within the threshold determined by the threshold determining circuit 36.

An image shake quantity detecting circuit 40 is arranged to detect the quantity of an image shake from within the luminance signal. For example, the circuit 40 is composed of a correlation computing circuit which is arranged to perform a representing point matching action. An actuator 42 is arranged to change the apex angle of the variable apex-angle prism 12. A driving control circuit 44 is arranged to drive the actuator 42 in accordance with the output of the image shake quantity detecting circuit 40. The deflection angle of the exit optical axis relative to the entrance optical axis of the prism 12 is controllable by adjusting the apex angle of the variable apex-angle prism 12.

The video camera of FIG. 1 operates as follows: an object's image passes the variable apex-angle prism 12 and the photo-taking lens 14 comes to the image sensor 16. The image sensor 16 then produces an image signal. The signal processing circuit 18 performs the above-stated signal processing operation on the output of the image sensor 16. A luminance signal Y output from the signal processing circuit 18 is supplied directly to the dividing circuit 28 and also indirectly to the dividing circuit 26 through the delay circuit 22. The delay circuit 22 delays the luminance signal for the period of one field (about 16.7 msec.) before it is supplied to the dividing circuit 26. The dividing circuits 26 and 28 are arranged to divide one whole image plane into m×n blocks in accordance with the pulses output from the blocks in accordance with the pulses output from the block dividing pulse generating circuit 24. In this case, m is assumed to be 20 and n to be 14 to give a total of 280 blocks.

Figure 2A:
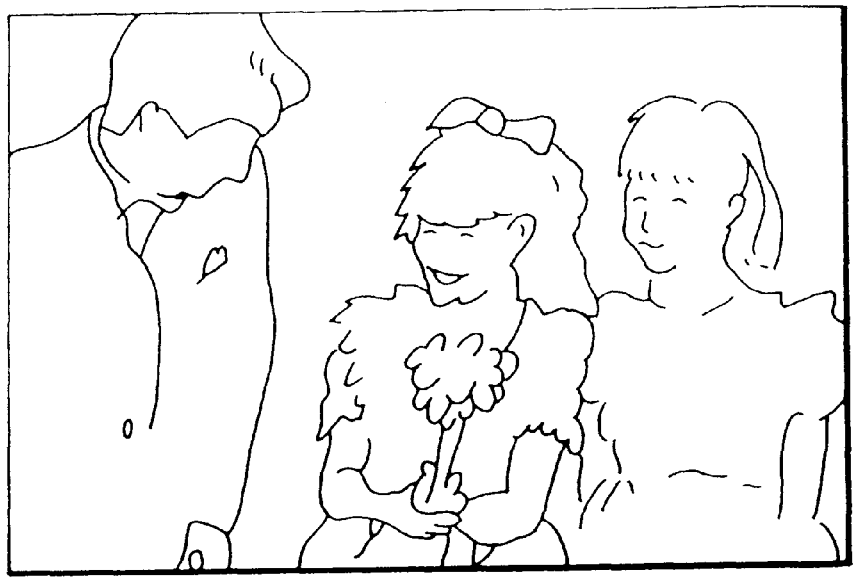
FIGS. 2(a) to 2(d) and 3(a) to 3(c) illustrate procedures to be taken by the first embodiment for determining areas.
Figure 2B:
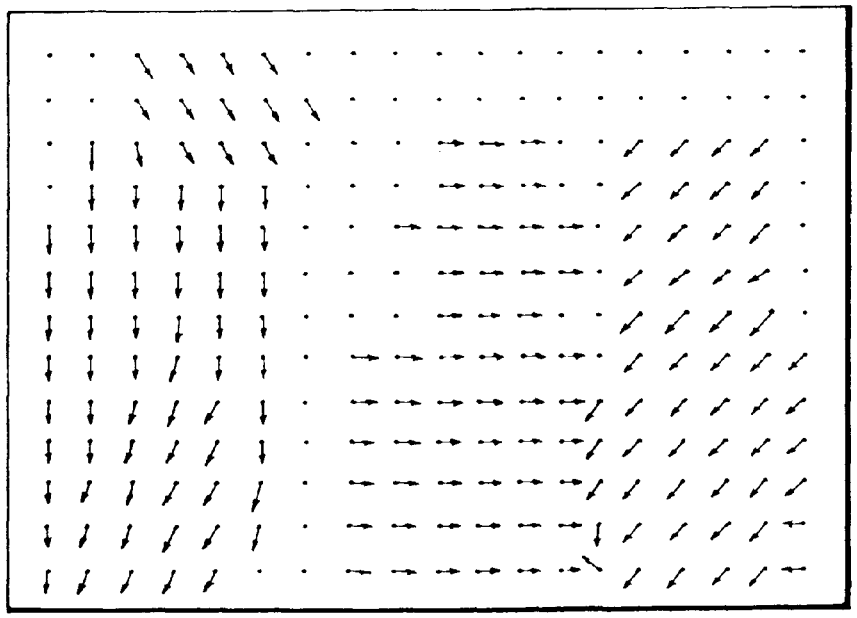
Figure 2C:
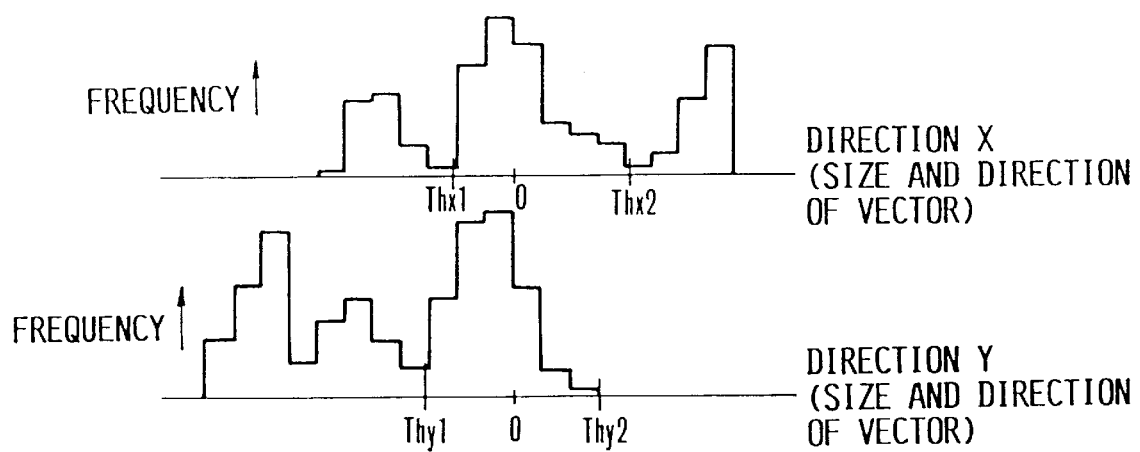
Figure 2D:
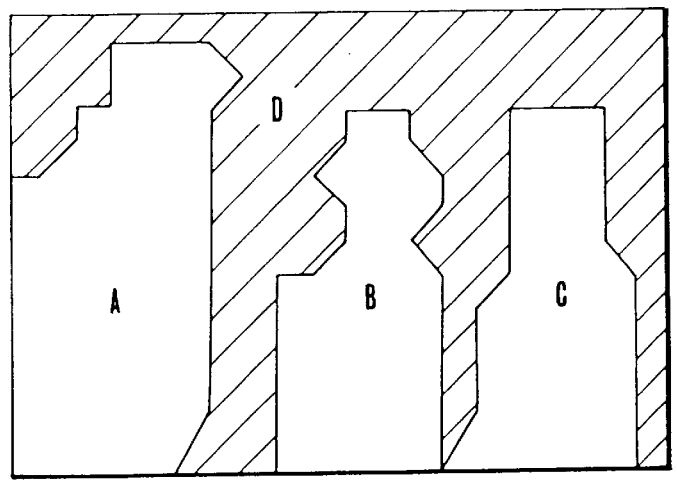

The movement vector detecting circuit 30 obtains the movement vectors for every block by a method called a time-space gradient method. This method is discussed by B. K. P. Horn, et al. in "Artificial Intelligence", 17, pp 185–203 (1981). It permits real time processing by a special purpose hardware. The movement vector obtained by this method for the whole image plane showing any movement taking place at every one of the blocks is called an optical flow. The actions of the circuit elements 30 to 38 are described with reference to FIGS. 2(a) to 2(d) as follows: FIG. 2(a) shows by way of example the image plane of a currently photographed field. FIG. 2(b) shows an optical flow obtained by accumulating for a given period of time a difference between the current field and an immediately preceding field. FIG. 2(c) shows histograms representing the optical flow in sizes obtained in the directions X and Y respectively. FIG. 2(d) shows the sections of areas recognized by this embodiment.

In this instance, a motion picture of a moving object is taken. As a result of the intention of the photographer to prevent the camera from moving, the movement of the background is less than that of the object. The movement vectors detected by the movement vector detecting circuit 30 are accumulated for a given period (one sec: for example) by the memory 32. After that, the accumulated vectors are supplied to the statistical processing circuit 34. The statistical processing circuit 34 prepares the histograms as shown in FIG. 2(c) by ranking these vectors according to the sizes of the X and Y components of each vector. In FIG. 2(c), the upper half of the drawing shows the vector histogram for the direction X and the lower half the vector histogram for the other direction Y. In these histograms, each of axes in the directions X and Y indicates positive and negative sizes, which are separated by an origin O set, for example, in the center of the image plane. The frequency values of the vectors are indicated in the vertical direction of the drawing. The threshold determining circuit 36 determines threshold values from the shape of these two histograms. In each of the directions X and Y, a very small value near a distribution part having a peak value closest to zero in each of the directions X and Y is found and the position of this value is determined to be the threshold value. Threshold values are obtained in this manner on both the positive and negative sides. In FIG. 2(c), reference symbols Thx1, Thx2, Thy1 and Thy2 respectively denote these threshold values.

The threshold values thus determined are supplied to the area determining circuit 38. The area determining circuit 38 looks up the blocks which are within the range of the threshold values among the movement vectors stored in the memory 32. For example, assuming that a block located in the i-th place in the direction of m and in the j-th place in the direction of n is expressed as a block Bij and that, within the block Bij, the moving quantity in the direction X is expressed as Uij and the moving quantity in the direction Y as Vij, the circuit 38 sets the following conditions:

Thx1<Uij<Thx2, and

Thy1<Vij<Thy2

Blocks satisfying these conditions are assumed to be "on" while the rest to be "off". Then a relation between "on" and "off" blocks becomes as shown in FIG. 2(d). In FIG. 2(d), a hatched part indicates the area of "on" blocks, which approximately coincide with the background area shown in FIG. 2(a).

The image shake quantity detecting circuit 40 computes and obtains a moving quantity from within the "on" area. The detecting method to be employed by the image shake quantity detecting circuit 40 is not limited to the representing point matching method. The movement can be detected at a high speed by image processing. The method may be replaced with any method that permits control over execution ("on") and non-execution ("off") of computation of correlation for every one of the blocks. The quantity of shake obtained by the image shake quantity detecting circuit 40 is supplied to the driving control circuit 44. The actuator 42 then drives the variable vertex-angle prism 12 in such a way as to lessen the output (quantity of shake) of the image shake quantity detecting circuit 40, i.e., to lessen the movement of the image plane due to shake of the camera.

The movement vector detecting circuit 30 and the image shake quantity detecting circuit 40 are preferably arranged to perform a computing operation for every field. However, the processing operation of the circuit elements 32 to 38 may be performed once in several hundred msec to several sec, because the camera shake frequency is generally within a range from 1 to 3 Hz and the frequency of mechanical vibrations of vehicles or the like higher than that. Therefore, any inadvertent object tracing action can be prevented by setting the cycle of the statistical computation of these circuit elements at a value longer than these periods.

Further, in the foregoing description, the histograms have been described as to be prepared both in the directions X and Y. However, this may be changed to prepare a histogram for a two-dimensional space X-Y. In a case where the optical flow is obtained by using images accumulated for a given period of time by the movement vector detecting circuit 30, the computing cycle of the circuit elements 32 to 38 must be changed accordingly.

Figure 3A:
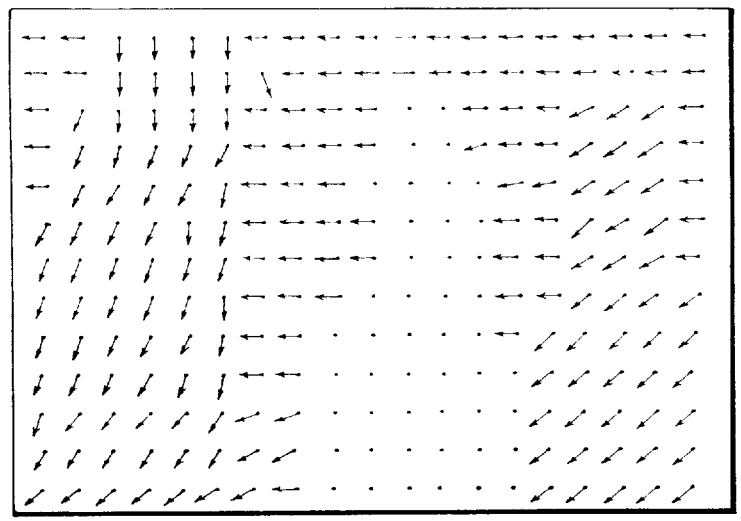
Figure 3B:
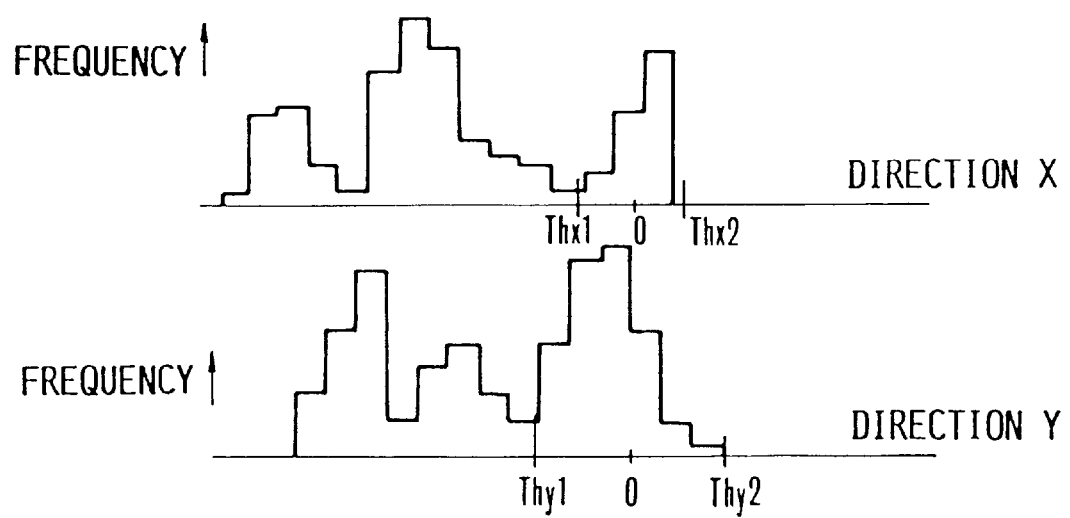
Figure 3C:
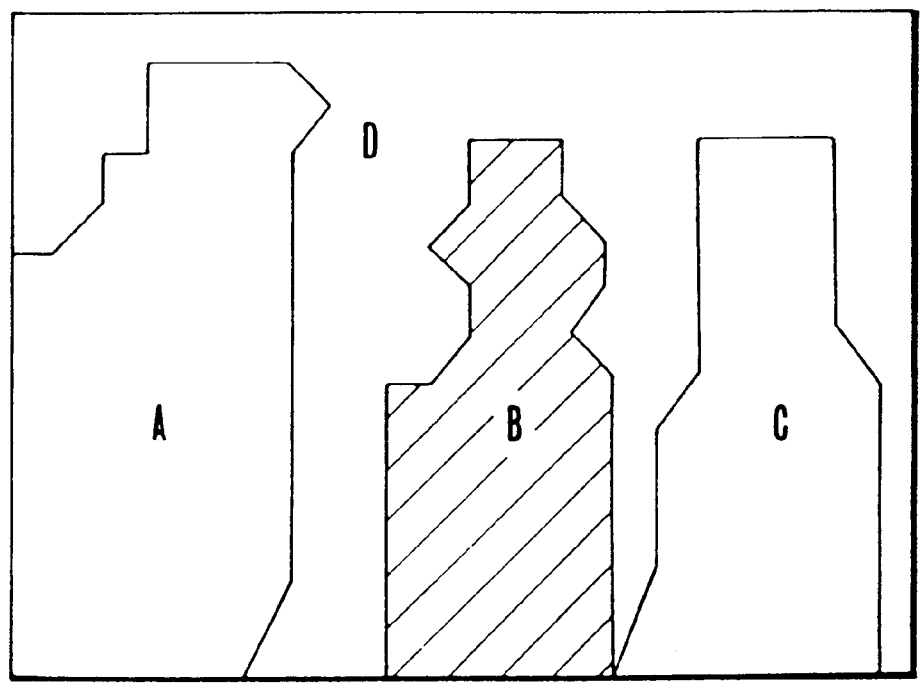

Next, in cases where the photographer wishes to perform panning by tracing (tracking) an object, the embodiment operates as follows: let us assume that a person B which is located in the central part of an image plane as shown in FIG. 2(a) is to be traced. In this instance, the optical flow becomes as shown in FIG. 3(a). Thus, the photographer tries to have the person B always in a given position within the image plane. As a result, the movement vectors become small at the image of the person B. Meanwhile, the movement vectors in the rest of the image plane including the background become large. FIG. 3(b) shows histograms similar to those of FIG. 3(c). FIG. 3(c) shows an "on" area (hatched part) determined by the area determining circuit 38. The threshold values Thx1, Thx2, Thy1 and Thy2 and the areas are determined by the same process as mentioned in the foregoing.

In the case of the embodiment described above, if the movement or deformation of the object is periodically repeated and if the statistical histogram processing periods of the circuit elements 32 to 38 are coinciding, a dynamic area having a repeating motion cannot be distinguished from a static area. In that instance, the changing quantity (dispersion) of the vector is obtained for each block. Any area that has the changing quantity not greater than a predetermined is determined to be a tracing area. For example, assuming that average vector values in a processing period T of the statistical process for vectors Uijt and Vijt of a block Bij obtained at a time point t are $\overline{Uij}$ and $\overline{Vij}$ and the dispersion degrees of the vectors are Sxij and Syij, the vector dispersion can be expressed as follows:

$$Sxij = \frac{1}{T-1}\sum_{t=1}^{T}(Uijt - \overline{Uij})^2$$

$$Syij = \frac{1}{T-1}\sum_{t=1}^{T}(Vijt - \overline{Vij})^2$$

The values Sxij and Syij of each block are compared with those of another. It is also possible to make this comparison in the square roots (standard deviations) of the values Sxij and Syij.

As described in the foregoing, in accordance with this invention, the object tracing area is determined by statistically processing the optical flow. Therefore, the embodiment is capable of automatically discriminating an object which is desired to be stably positioned within the image plane from other objects, even if these objects are hardly distinguishable by luminance from each other or even if there are plurality of moving objects within the image plane. The invented area determining method is not limited to a TV camera. It will find a widely ranged applications including an industrial TV camera and monitoring camera. The embodiment of this invention has salient advantages for practical applications.

Figure 4:
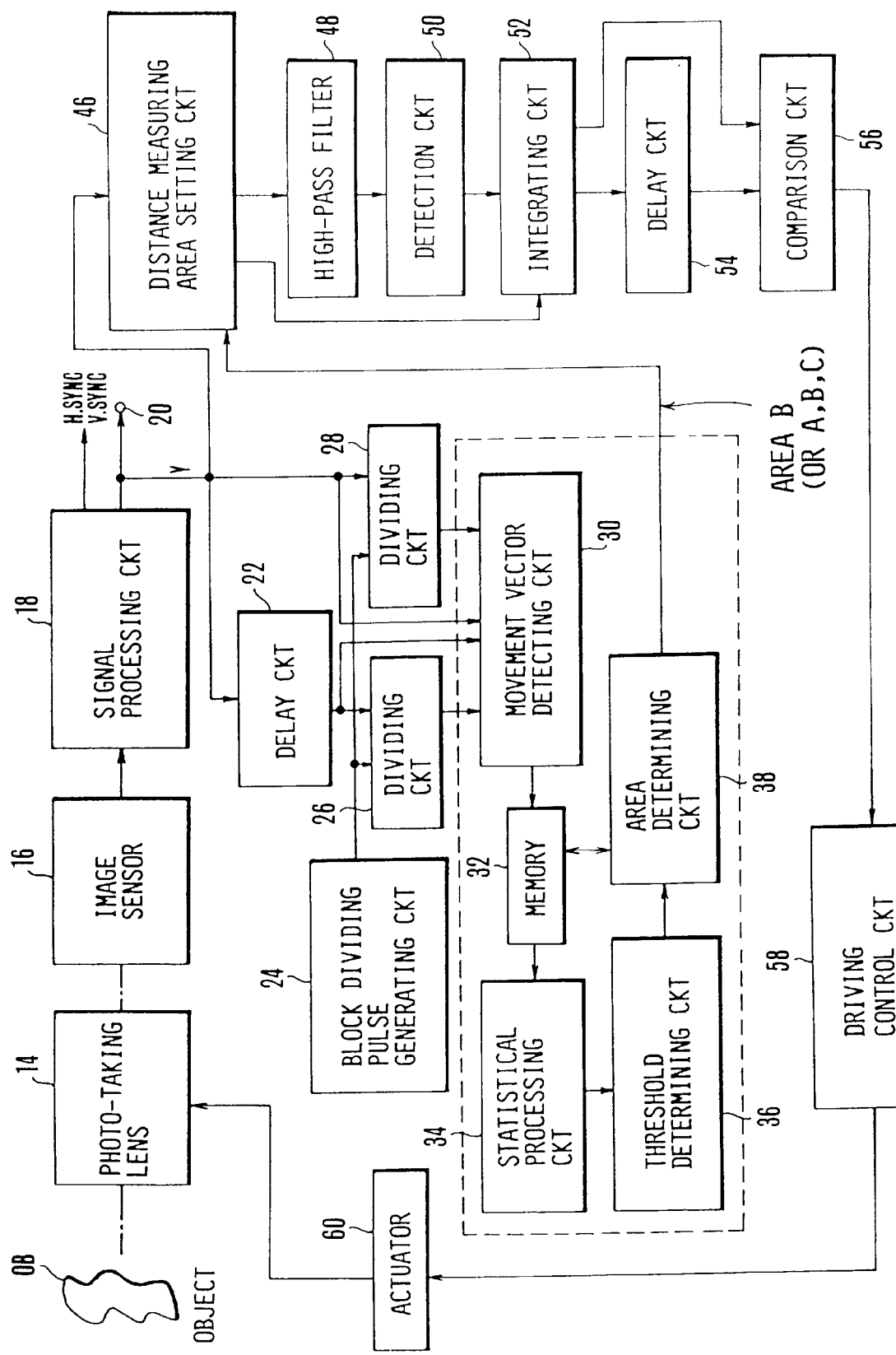
FIG. 4 is a block diagram showing a video camera to which this invention is applied as a second embodiment thereof.

The foregoing has described the means for setting the detecting areas such as a tracing area, etc. by detecting the state of the image sensing plane through the optical flow of movement vectors. Next, practical means for setting a focus detecting area, i.e., a distance measuring area, on the image sensing plane by using an optical flow is arranged as a second embodiment as described below:

FIG. 4 is a block diagram showing the distance measuring area setting device of a video camera which is arranged as a second embodiment of the invention. In FIG. 4, the same parts which are arranged in the same manner as in the case of FIG. 1 are indicated by the same reference numerals and the details of them are omitted from the following description.

The second embodiment differs from the arrangement of FIG. 1 in the following point: the variable angle prism 12, the prism driving actuator 42 and the prism driving control circuit 44 are omitted. The second embodiment is provided with, instead of them, a focusing actuator 60 for adjustment of the focus of the photo-taking lens 14 and a driving control circuit 58 for driving the actuator 60. The second embodiment is further provided with automatic focus detecting blocks 48 to 56 in combination with a distance measuring area setting circuit 46. The circuit 46 is arranged to set a distance measuring area on the image sensing plane for measuring a distance to the object on the basis of information on the movement vectors obtained from the movement vector detecting circuit 30.

Referring to FIG. 4, the actuator 60 is arranged to drive the focusing lens of the photo-taking lens 14 for the purpose of automatic focusing. The driving control circuit 58 is arranged to control the actuator 60. A high-pass filter (HPF) 48 is arranged to extract a high frequency component from a luminance signal. A detection circuit 50 is arranged to convert the high frequency component extracted by the HPF 48 into a DC signal. An integrating circuit 52 is arranged to produce a signal which hereinafter will be called AF signal. A delay circuit 54 is arranged to delay the AF signal produced from the integrating circuit 52 for a given period of time which is, for example, one field period. A comparison circuit 56 is arranged to compare the delayed AF signal with the current AF signal. The driving control circuit 58 drives the actuator 60 in accordance with the output of the comparison circuit 56 for focusing.

The operation of the second embodiment shown in FIG. 4 is as follows: the object's image which has passed through the photo-taking lens 14 comes to the image sensor 16. The image sensor 16 then produces an image signal. The signal processing circuit 18 performs a signal processing action on the output of the image sensor 16 in the manner as described in the foregoing. The luminance signal Y output from the signal processing circuit 18 is applied directly to the dividing circuit 28. The luminance signal Y is also applied to another dividing circuit 26 after it is delayed for one field period by the delay circuit 22. Each of the dividing circuits 26 and 28 is arranged to divide the whole image plane into m×n blocks (m represents 20 and n 14, to have a total of 280 divided blocks).

The movement vector detecting circuit 30 obtains the movement vector of every divided block by the above-stated time-space inclination method. Histograms showing magnitudes obtained in the directions X and Y as shown in FIG. 2(c) are obtained from the optical flow shown in FIGS. 2(a) and 2(b). Then, the states of movement of areas obtained on the image sensing plane are classified as shown in FIG. 2(d) on the basis of the histograms. This process is the same as in the case of the first embodiment and, therefore, its details are omitted from the following description.

In other words, as described in the foregoing, a hatched area consisting of "off" blocks which satisfy the condition Thx1<Uij<Thx2 and Thy1<Vij<Thy2 is discriminated from the void area consisting of "on" blocks other than the "off" blocks as shown in FIG. 2(d). The hatched area of the "off" blocks approximately coincides with the background area while the void areas of the "on" blocks coincide with the object areas.

Since the void parts which are not hatched in FIG. 2(d) represent objects, other than the background, including the main object on which the camera must be focused, the distance measuring area setting circuit 46 allows only the luminance signal parts for the areas A, B and C of FIG. 2(d) to pass there. The luminance signal thus passed is supplied to the HPF 48 to have the high frequency component extracted. The output of the HPF 48 is subjected to a detection process at the detection circuit 50. The output of the circuit 50 is integrated by the integrating circuit 52 to be output from the integrating circuit 52 as the AF signal. The comparison circuit 56 compares the AF signal of the current image plane with the AF signal of the preceding image plane. The result of comparison is applied to the driving control circuit 58. In accordance with this, the driving control circuit 58 drives the actuator 60 to operate in the direction of increasing the AF signal. When the AF signal reaches a maximum value and just begins to decrease, the position of the actuator 60 is brought back to the maximum value point and the focusing action comes to an end.

In a case where the size of the distance measuring area of the current field differs from that of the preceding field, the integrated value of the AF signal also differs. Simple comparison under that condition would mislead magnitude determination. In that event, therefore, the area ratio must be corrected. To meet this requirement, in the case of FIG. 4, integration sensitivity changeover information is sent to the integrating circuit 52 from the distance measuring area setting circuit 46 in accordance with the changes occurring in the area of the distance measuring area. The area ratio is thus corrected by virtue of this arrangement.

While the distance measuring area is assumed in the description above to be the same as the area set by the area setting circuit 38, the area B of FIG. 2(d) which is located in the central part of the image plane may be selected solely as the distance measuring area. In that instance, other areas A and C may be either completely cut by a logic circuit arrangement or variously weighted by arranging a window function in such a manner that the central part of the image plane is weighted 100% and the four diagonal corners of the image plane weighted 0% with the weight attaching rate continuously varied between the central part and each of the corner parts.

Figure 5:
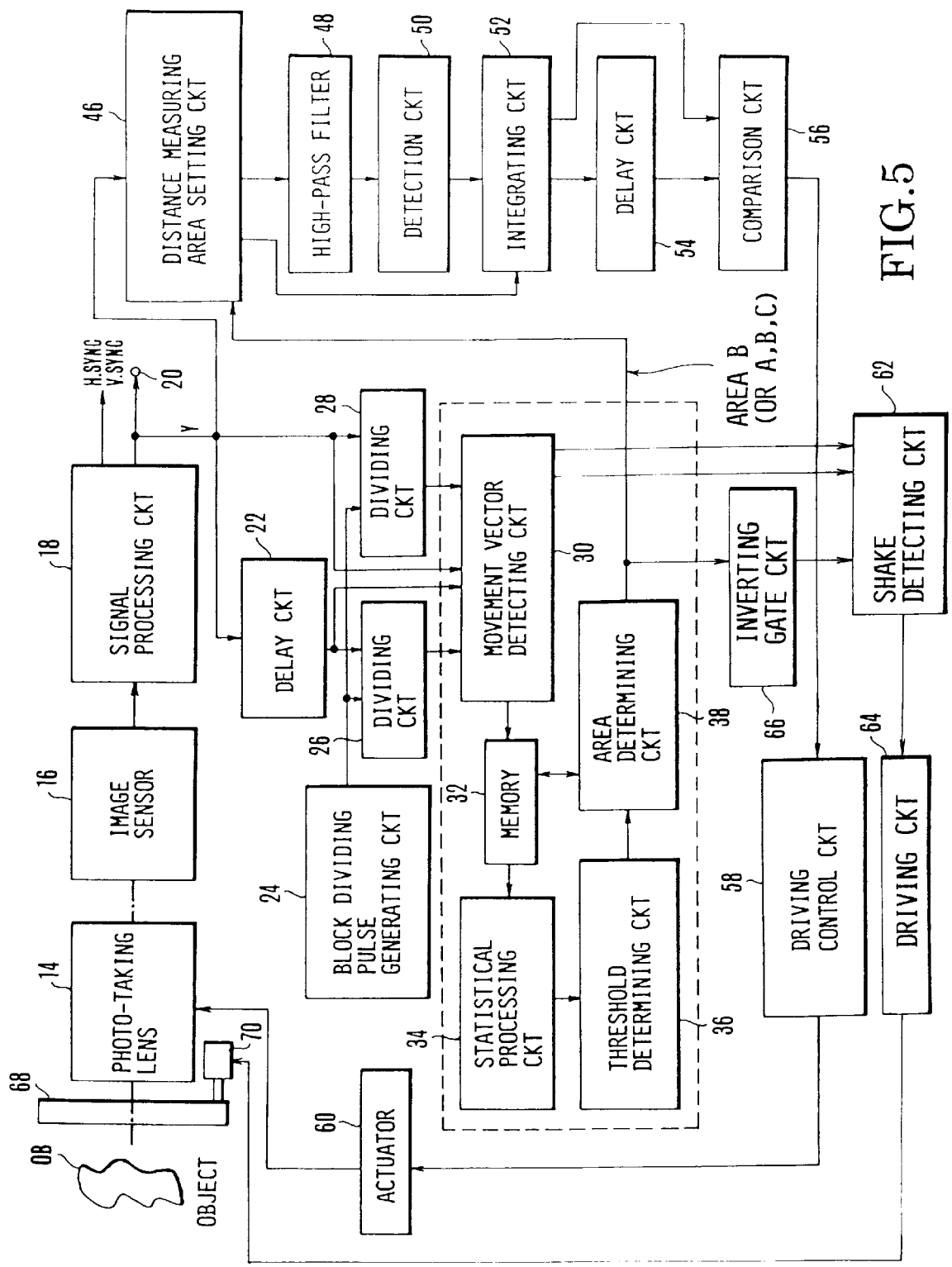
FIG. 5 is a block diagram showing a video camera arranged as a third embodiment of the invention.

FIG. 5 shows the arrangement of another embodiment. In the case of this example, a camera shake compensating device which is arranged like that of FIG. 1 is added to the second embodiment described above. The lens is continuously focused on the main object while the camera shake is automatically compensated for by the arrangement which is as shown in the block diagram of FIG. 5. In FIG. 5, the same component parts as those of FIGS. 1 and 4 are indicated by the same reference numerals and the details of them are omitted from the following description. Referring to FIG. 5, a variable angle prism 68 is arranged in front of the photo-taking lens 14 to have its optical axis variable. The prism 68 is composed of two glass plates and a transparent silicone rubber, liquid or the like sealed in between the glass plates. An inverting gate circuit 66 is arranged to obtain a D area signal for the area D which is other than the distance measuring object area selected by the area determining circuit 38 and is indicated by the hatching in FIG. 2(d) representing a background. A shake detecting circuit 62 is arranged to extract from the movement vector detecting circuit 30 the size and direction of the movement vectors obtained within the background area D of FIG. 2(d) as set by the inverting gate circuit 66. A driving circuit 64 is arranged to cause the variable angle prism 68 to be driven in the direction of offsetting a shaking degree by controlling an actuator 70 on the basis of the output of the shake detecting circuit 62.

Referring again to FIGS. 2(a) to 2(d), when the camera is fixed for the objects A, B and C, the background area D remains still so long as the camera remains stationary. Under this condition, information on the shaking state of the camera is obtainable by detecting the movement vector of the area D. Therefore, the shake detecting circuit 62 detects the degree and direction of the camera shake and then the variable angle prism 68 is driven in the direction of compensating for the shake. This enables the lens to be continuously focused without having the problem of the "far-near competing condition" by setting the distance measuring area for an object moving within the image sensing plane while shaking of the camera is being compensated for in the above-stated manner.

In the event of a panning state, in which the photographer moves the camera following an object, the embodiment operates as follows: assuming that the camera is following the middle person B as shown in FIGS. 2(a) to 2(d), the optical flow then becomes as shown in FIG. 3(a). Since the photographer is attempting to have the person or object B always in a fixed part of the image plane, the movement vector of the position of the person B becomes small. Meanwhile, the movement vectors of other parts including the background becomes large. Therefore, the distance measuring area is set at the area B. FIG. 3(b) shows histograms in the same manner as FIG. 2(c). FIG. 3(c) shows the relation to other parts of the "on" area which is indicated by the hatching and is determined by the area determining circuit 38. The thresholds Thx1, Thx2, Thy1 and Thy2 and the area are determined in the same manner as described in the foregoing.

In the case of panning mentioned above, the camera is moved to follow a moving object. In this instance, contrary to a case where the camera is fixed, the distance measuring area must be set at the area B of FIG. 3(c) which has the small movement vector. Therefore, when the panning of the camera is detected, the above-stated area setting output signal of the area determining circuit 38 should be inverted before it is supplied to the distance measuring area setting circuit 46.

Figure 6:
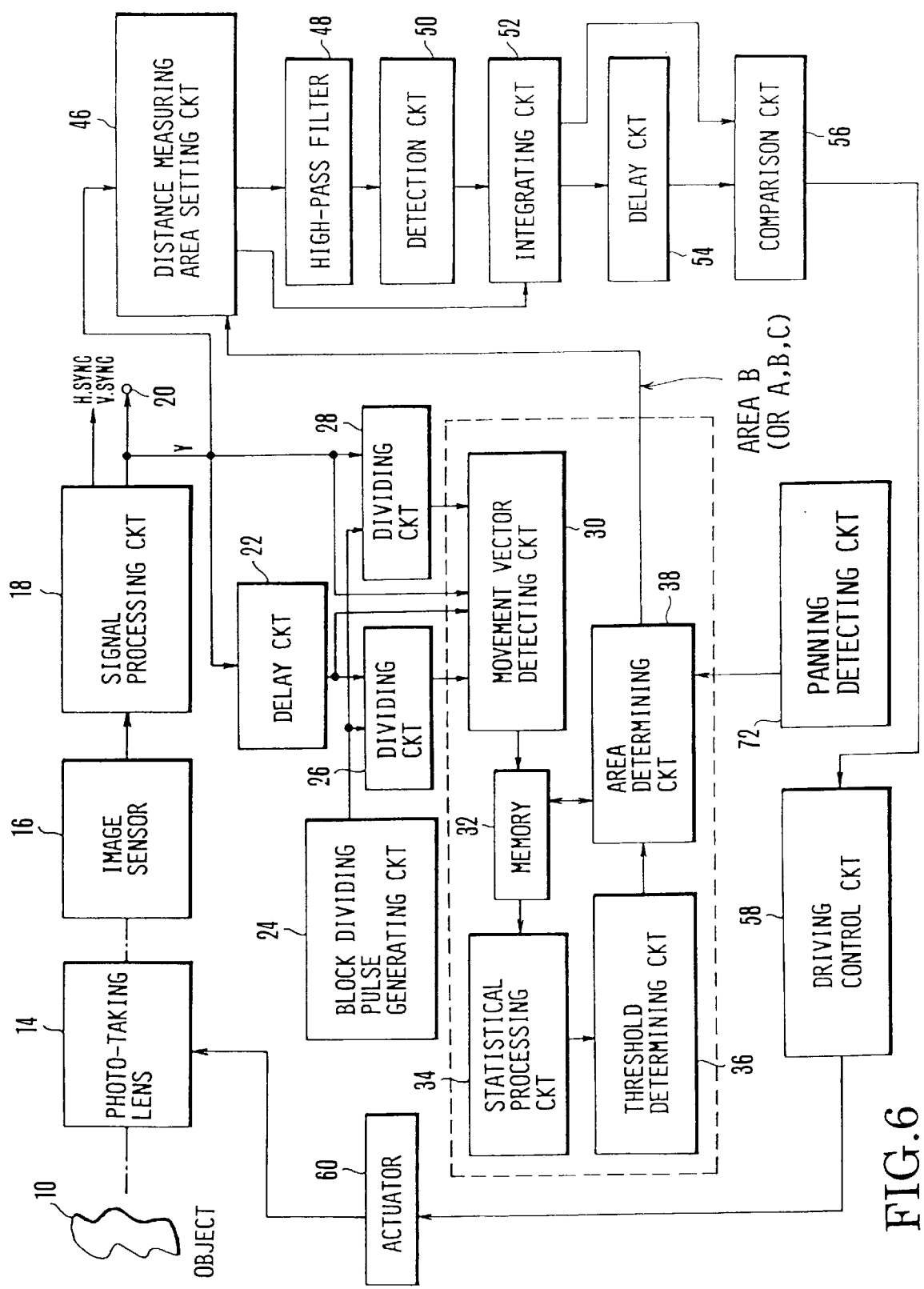
FIG. 6 is a block diagram showing a video camera arranged as a fourth embodiment of the invention.

FIG. 6 shows in a block diagram one example of arrangement for meeting the above-stated requirement. In FIG. 6, the same component parts as those of FIG. 5 are indicated by the same reference numerals. A panning detecting circuit 72 is arranged to detect the panning movement of the camera. For example, when the movement of the camera in one direction continues for a short period of time, the circuit 72 determines it as the panning and produces a control signal. More specifically, the frequencies of camera shaking are distributed within a band from 0.5 to 10 Hz or thereabout. Therefore, the degree of movement is detected from the output of a band-pass filter which is arranged to extract a frequency band lower than this frequency band. When the movement comes to exceed a given value, the circuit 72 determines it as the panning. The panning of the camera can be detected by other different methods. However, the other methods are omitted from the following description.

When the control signal indicating that the camera is presently in a panning movement is output from the panning detecting circuit 72, the distance measuring area setting circuit 46 is instructed to adjust the distance measuring area to the object B which is as shown in FIG. 3(c) and has no movement vector between the thresholds THx1, Thx2, Thy1 and Thy2 mentioned in the foregoing. In accordance with the arrangement, the distance measuring area is set at an object part having a large movement in cases where the camera is fixed with an object part showing some movement while there is not much movement in the background part. In the case of panning where the object part shows no movement while the background part shows a large movement, the distance measuring area is set at the object part showing not much movement. These actions which appear to be contradictory to each other can be smoothly carried out. The advantageous effect of this embodiment is also attainable by providing the camera with an operation switch which is arranged to be operated in the event of the panning.

While the camera is fixed in position to prevent any camera shake while the distance measuring area is automatically set for a main object in the case of FIGS. 2(a) to 2(d), the camera is moved to follow a main object in the case of FIGS. 3(a) to 3(c). In both cases, the image of the main object is generally located approximately in the central part of the image plane. Therefore, in order to have a distance measuring area set without making any discrimination between these different cases, the distance measuring area may be set in an area having about the same vector as the vector of the area located near the center of the image plane.

Figure 7:
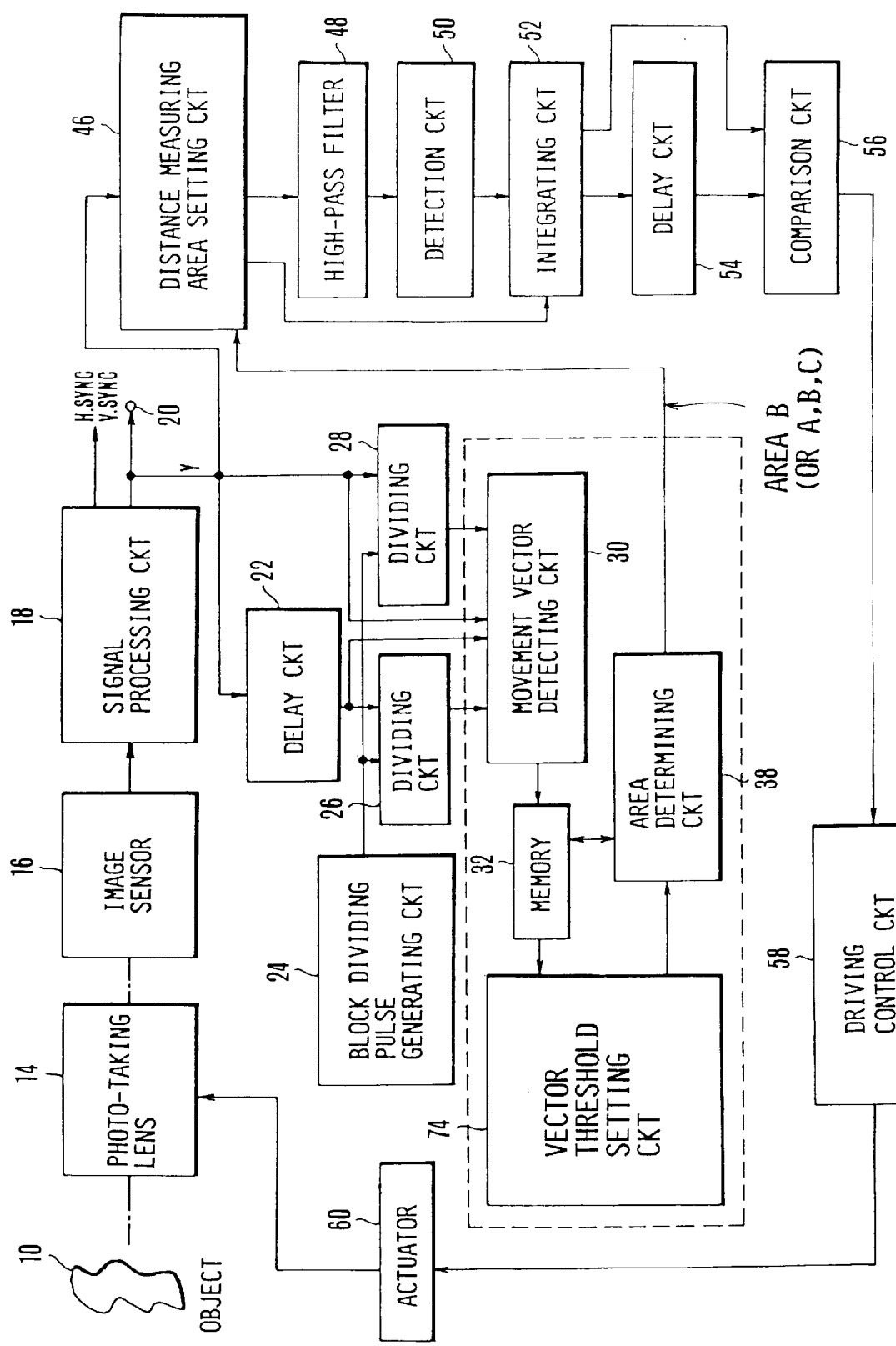
FIG. 7 is a block diagram showing a video camera arranged as a fifth embodiment of the invention.

FIG. 7 is a block diagram showing a further embodiment of the invention. Referring to FIG. 7, a vector threshold setting circuit 74 is arranged to set the threshold value of vector by extracting the movement vector of a predetermined central part of the image plane from the content of a memory 32 which stores the movement vectors of the whole image plane, by determining the size of the extracted movement vector and by carrying out a predetermined statistical process on the size determined. The area determining circuit 38 is arranged to look up, on the memory 32, any area that has the movement vector output from the vector threshold setting circuit 74 and to produce and supply an area setting gate signal to the distance measuring area setting circuit 46. On the memory 32, the movement vector values of the central part of the image sensing plane are always detected; and the distance measuring area is set having movement vectors which are within about the same range as the range of the central part vector values. With the embodiment arranged in this manner, a distance measuring area can be automatically set without making any discrimination between the case of FIGS. 2(a) to 2(d) where the camera is fixed and the case of FIGS. 3(a) to 3(c) where the camera is moved to follow a moving object.

As apparent from the above description, the embodiment is capable of setting a distance measuring area in a shape and a position nearly in conformity to the intention of the photographer as the embodiment is arranged to determine the distance measuring area by statistically processing the optical flow in accordance with this invention. Further, the arrangement of the embodiment described precludes any possibility of having the lens caused to be focused on the background by the "far-near competing condition" or having the focus shifted from the main object to the background with the main object coming outside the distance measuring area. The embodiment is also capable of following the object when its image moves within the image plane. The arrangement of the embodiment will find a wide range of applications including not only photographing TV cameras but also industrial TV cameras, monitor cameras, etc. The embodiment thus has a great advantage in terms of practical applications.

FIGS. 8 to 11 show a sixth embodiment of the invention. In this case, an image movement detecting device which utilizes the optical flow of the movement vectors mentioned in the foregoing is applied to an automatic focusing device. The background of the sixth embodiment is first described as follows:

The video camera has recently come to use an automatic focusing device which uses the video signal of the camera and is capable of detecting an in-focus state by using information on the image obtained within an image plane irrespectively of distance to the object to be photographed. Therefore, the automatic focusing device of this kind has become popular in place of the focus detecting method of performing focus detection by projecting infrared rays or ultrasonic waves and detecting reflection waves.

The focus detection method of the kind using the video signal can be roughly divided into two methods.

In one of the two methods, the video signal is modulated by forcedly bringing about an out-of-focus state by slightly vibrating either a component lens member of a photo-taking optical system or an image sensor in the direction of the optical axis with an actuator such as a dimorph element, a voice coil or the like (hereinafter this will be called a modulation method).

In the other method, the photo-taking optical system is driven in such a way as to cause, for example, a high-frequency component of the video signal to be at a maximum value (hereinafter called a trial method).

In accordance with the modulation method, an in-focus degree little varies and the modulated signal remains almost at zero after an in-focus state is attained even when the photo-taking optical system is vibrated. In the event of an out-of-focus state, a modulated signal is generated. Then, the phase of the modulated signal relative to the modulating signal is inverted according to whether it is in a near focus state or in a far focus state. Therefore, the focus adjusting actuator (which is a DC motor in general) is restarted according to the presence or absence of this modulated signal. The restarting direction is determined according to the phase of the modulated signal. This enables the actuator to be accurately restarted. However, the modulation method necessitates the modulating actuator to be of a high degree of precision and to be capable of performing a highly accurate action. Therefore, the structural arrangement of the camera becomes complex and large. As a result, it not only requires complex adjustment but also is disadvantageous in terms of electric energy consumption.

In the case of the trial method, the lens or the image sensor is moved in such a way as to bring a signal component corresponding to a focusing degree to its maximum value.

After attainment of an in-focus state, a focus signal obtained then is stored. After that, a current focus signal is compared with the stored signal. When the result of comparison indicates occurrence of any change, the focus adjusting actuator is restarted. This method does not require any complex driving system for focus adjustment to permit simplification and reduction in size of the camera. A drawback of the trial method, however, resides in that: In restarting the actuator after it has been brought to a stop with an in-focus state attained, information on the direction in which the lens or the image sensor is to be driven is often unobtainable. This necessitates trial shifting of the lens in one direction or the other. If the focus signal increases in the direction thus indicating that the lens position is approaching to an in-focus point, the actuator is allowed to drive the lens further. However, if the focus signal decreases thus indicating that the lens is being shifted in the wrong direction, the driving direction of the actuator is reversed. Since this method theoretically necessitates such a trial action, it does not ensure a stable automatic focusing operation.

In the case of the sixth embodiment, the invented shake detecting method of using the optical flow of movement vectors is applied to the simple arrangement of the above-stated trial method in such a way as to make available the information on the lens driving direction. The automatic focusing device which is arranged as the sixth embodiment comprises focus detecting means which is arranged to perform focus adjustment by detecting a focusing degree on an object appearing within the image plane; movement vector detecting means for obtaining the movement vectors of an image in each of a plurality of divided areas of the image plane; and control means arranged to compute the moving degree of the image on the basis of movement vector information output from the movement vector detecting means and to actuate the focus detecting means when the moving degree comes outside a predetermined range.

With the direction in which the object and the camera move relative to each other thus detected from the information on the image movement vectors, the automatic focusing device can be restarted according to the information. Unlike the modulation method which requires a complex and high precision mechanism including the modulating actuator, etc., the embodiment is capable of stably, promptly and highly accurately carrying out an automatic focusing action with a simple structural arrangement which is fundamentally based on the trial method.

In FIGS. 8 to 11, the component parts which are either the same or are arranged to perform the same actions as the corresponding parts of FIGS. 1 to 7 are indicated by the same reference numerals and symbols and the details of them which have already been described are omitted from the following description.

Figure 8:
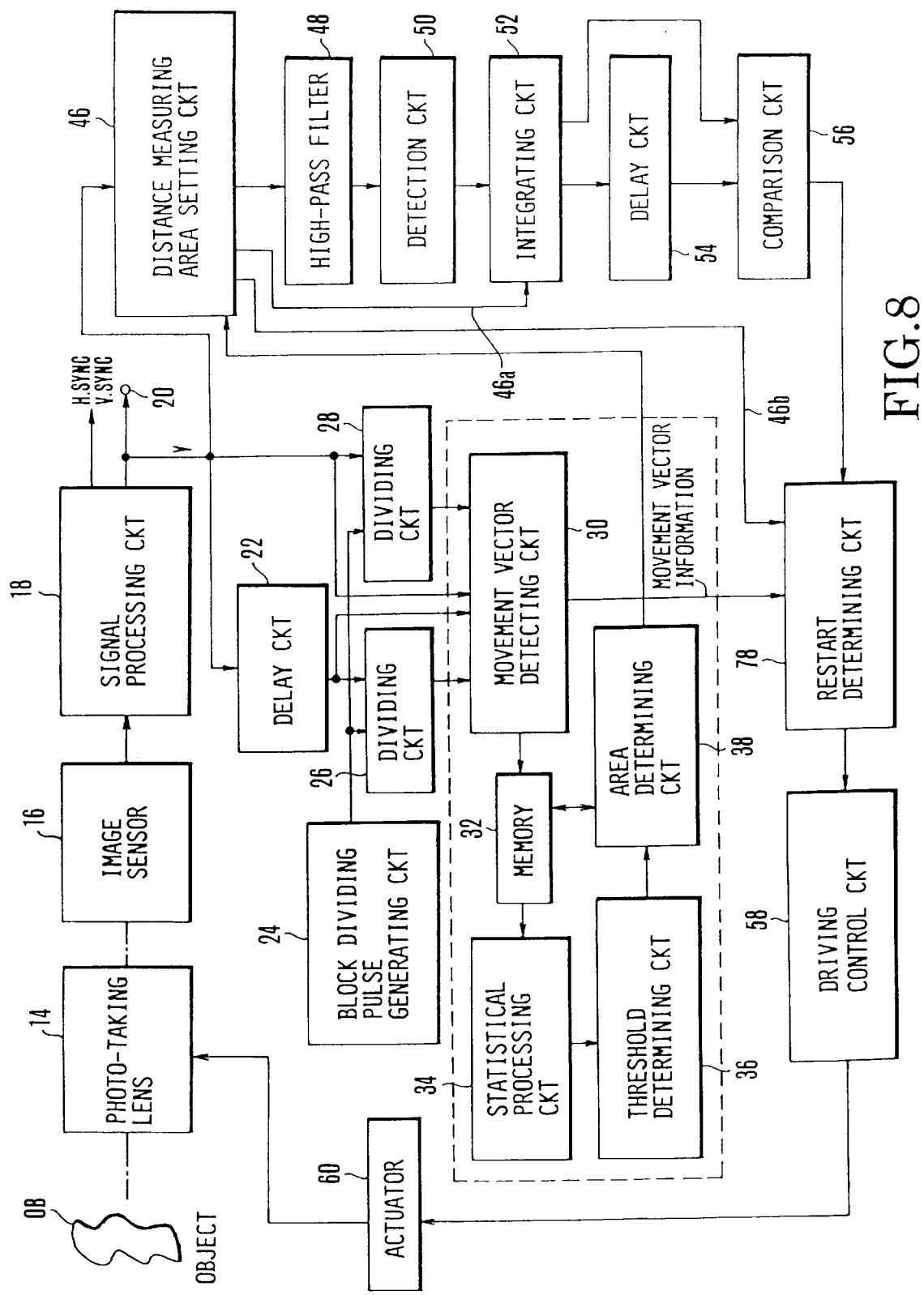
FIG. 8 is a block diagram showing an automatic focusing device which is arranged according to this invention as a sixth embodiment thereof.

FIG. 8 is a block diagram, which differs from the arrangement of FIG. 1 in the following points: the variable apex-angle prism 12, the prism driving actuator 42 and the driving control circuit 44 are omitted similarly to the second embodiment shown in FIG. 4. Arranged in place of them are a focus adjusting actuator 60 for focus adjustment of the photo-taking lens 14 and a driving control circuit 58 which controls the actuator 60. There are also provided automatic focus detection blocks 46 to 56 which are arranged to detect a movement of the object on the basis of movement vector information obtained from the movement vector detecting circuit 30. A restart determining circuit 78 is provided for restarting the automatic focusing device.

Referring to FIG. 8, the restart determining circuit 78 is arranged to receive the output of the movement vector detecting circuit 30, the outputs of a distance measuring area setting circuit 46 and the output of a comparison circuit 56 and to determine according to these outputs whether the automatic focusing device is to be restarted.

Next, an automatic focus adjusting system is arranged as follows: the distance measuring area setting circuit 46 is composed of a gate circuit which is arranged to cause only a luminance signal which is included in a luminance signal Y output from the signal processing circuit 18 and which corresponds to a focus detection area (distance measuring area) set on the image sensing plane to pass. The circuit 46 sets the distance measuring area on the image sensing plane on the basis of the output of the area determining circuit 38. A high-pass filter 48 is arranged to extract a high-frequency component from the luminance signal which corresponds to the distance measuring area set by the distance measuring area setting circuit 46. A detection circuit 50 is arranged to convert into a DC level signal the high-frequency component extracted by the high-pass filter 48. An integrating circuit 52 is arranged to integrate for a given period the DC level signal output from the detection circuit 50. Further, the integrating circuit 52 is arranged to have its integrating sensitivity controlled by a control signal 46a output from the distance measuring area setting circuit 46 accordingly as the distance measuring area changes, so that area correction is performed. A delay circuit 54 is arranged to delay the output signal (hereinafter referred to as a focus signal) of the integrating circuit 52 for a predetermined period of time which, for example, corresponds to one field. The comparison circuit 56 is arranged to compare a currently obtained focus signal with a focus signal obtained one field period before and delayed by the delay circuit 50. A driving control circuit 58 is arranged to drive and control an actuator 60 (a DC servo motor, for example) which is arranged to control the focusing state of the photo-taking lens 14.

The automatic focusing device which is arranged according to this invention as described above operates in the following manner:

As mentioned in the foregoing, the area determining circuit 38 is arranged to produce information on the patterns of the object parts A, B and C and the pattern of the background area D, as shown in FIG. 2(d). The distance measuring area setting circuit 46 performs a gating action on the basis of this information in such a way as to cause only the luminance signal of a main object part to pass and supplies it to a high-pass filter 48. In other words, an area where the main object is located is thus set as the distance measuring area. At the high-pass filter 48, the high-frequency component is extracted from the luminance signal supplied there. The extracted high-frequency component is converted into a DC level signal by the detection circuit 50 and is integrated for a predetermined period of time by the integrating circuit 52. The integrating circuit 52 then produces a focus signal. The focus signal is supplied to the comparison circuit 56 along with a focus signal which relates to a previous image plane obtained one field period before and which has been delayed for one field period by the delay circuit 54. These focus signals of the current image plane and the previous image plane are compared with each other by the comparison circuit 56. The result of comparison is supplied via the restart determining circuit 78 to the driving control circuit 58. The driving control circuit 60 then controls and causes the actuator 60 to drive the photo-taking lens 14 in the direction of increasing the level of the focus signal. When the focus signal level reaches a maximum value and then decreases, the position of the lens obtained when the focus signal level has reached the maximum value is determined to be an in-focus position. The photo-taking lens 14 is brought back to that position and the automatic focusing action comes to an end.

When the integration outputs of the integrating circuit 52 are compared by the comparison circuit 56 during the process of the automatic focusing action, if the size of the distance measuring area previously set one field period before is found to differ from that of the distance measuring area of the current field, the integration signals differ in level although the focused state remains unchanged. In such a case, the difference in level might cause erroneous determination as the result of level comparison does not correspond to the focused degree. To solve this problem, a control signal 46a which represents the size of the distance measuring area is supplied to the integrating circuit 52. Any area difference between the distance measuring areas of the two field image planes is compensated for by virtue of this control signal. In other words, the integration signal output level of the integrating circuit 52 is normalized by the area value of the distance measuring area. In the case of this embodiment, the above-stated compensation is accomplished by changing the integrating sensitivity of the integrating circuit 52 from one value over to another.

The practical arrangement of the distance measuring area setting means is as described above. In the statistical processing operation which is performed jointly by the memory 32, the statistical processing circuit 34, the threshold determining circuit 36 as described in the foregoing, the histograms are prepared both for the directions X and Y of the image sensing plane. However, this may be changed to prepare a histogram for an X-Y two-dimensional space. Further, in a case where the optical flow is obtained at the movement vector detecting circuit 30 by using an image accumulated for a given period of time, the operation cycle of the group of circuit elements from the memory 32 to the area determining circuit 38 must be changed according to the image accumulating period of time.

As described in the foregoing, the distance measuring area is set according to the output of the area determining circuit 38. However, for ordinary photographing, a main object is located in the central part of the image plane. In addition to this, it is desirable to avoid a distance measurement confusion between the main object and the background. Therefore, an area in and around the central part of the image plane alone may be selected as the distance measuring area. In that case, the areas A and C can be completely disregarded. It is also possible to set a window function in such a way as to have the central part of the image plane weighted 100% and the four diagonal corners 0% with the weight of the area between these parts arranged to continuously vary.

Figure 9:
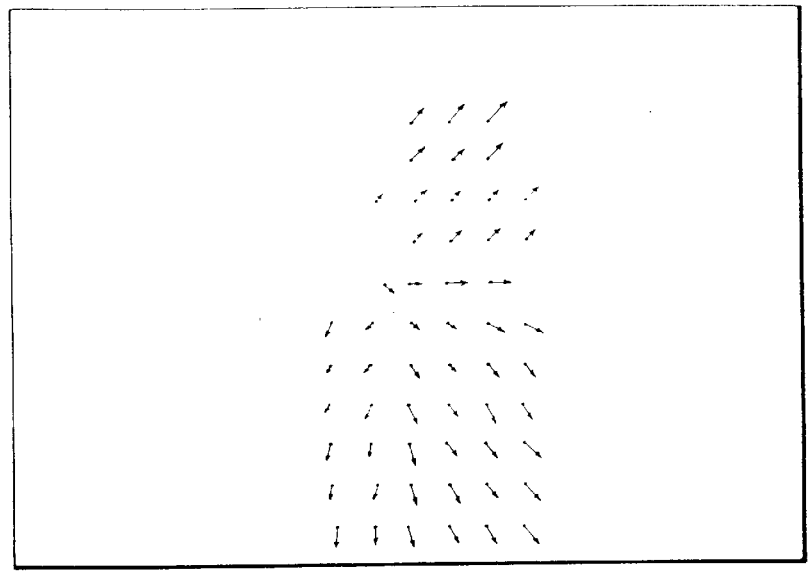
FIG. 9 is an illustration of an operation performed to determine a distance measuring area according to an optical flow.

The restart of the automatic focusing device on the basis of the movement vectors is actually determined in the following manner: for the sake of simplification of illustration, the distance measuring area is assumed to be set in the central part of the image plane and around it, for example, as represented by the area B in FIG. 2(d). FIG. 9 shows an optical flow obtained in the area B under this condition. In the case of this optical flow, the object corresponding to the area B is moving a little toward the upper right-hand side of the image plane while approaching to the camera. The movement vectors in the divided blocks are as a whole trending to the right having the directions and sizes divergent toward the peripheral area. This indicates that the object is approaching the camera and, at the same time, is moving to the right-hand side thereof.

Figure 10:
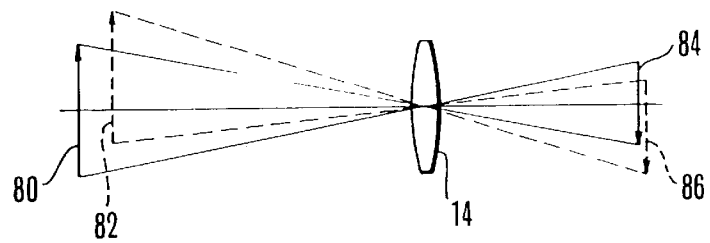
FIG. 10 is an illustration of the nature of the optical flow.

FIG. 10 shows the nature of an optical flow of this type. Referring to FIG. 10, a photo-taking lens 14 is identical with the photo-taking lens 14 of FIG. 8. A reference numeral 80 denotes the object which corresponds to the area B of FIG. 2(d). A numeral 84 denotes an image formed on the image sensing plane representing the object. A numeral 82 denotes a state of the object obtained when it moves upward as viewed on FIG. 9 while it is approaching the photo-taking lens 14. A numeral 86 denotes the image of the moved object. The vectorial size of the optical flow which represents the upward movement as viewed on the drawing is unvarying irrespectively of their positions within the image plane. Whereas, the optical flow resulting from the approach of the object to the lens is brought about by the expansion of the object's image and the vectorial size thereof changes accordingly as its position varies within the image plane. The size of the vector is zero on the optical axis of the photo-taking lens 14, i.e., in the center of the image plane and increases accordingly as its distance from the central part of the image plane increases. The optical flow of FIG. 9 is a composite optical flow consisting of the vectors resulting from these two different factors. Further, while the images 84 and 86 on the image sensing plane are illustrated as in different positions on the optical axis, they are in actuality formed on one and the same plane.

Figure 11:
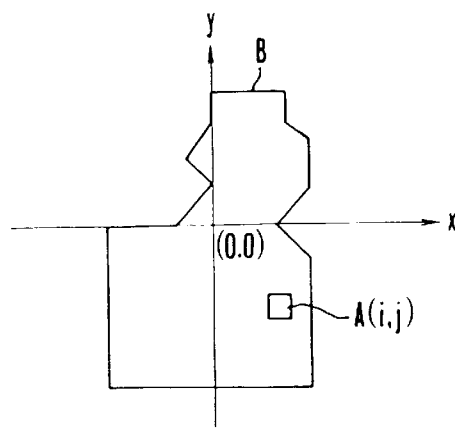
FIG. 11 is an illustration of an operation performed to decide a restart by detecting a movement of an object within the distance measuring area.

Next, a computing operation which is performed within the restart determining circuit 78 is described as follows: FIG. 11 is a graphical representation of the area B of FIG. 2(d). Coordinates x and y are obtained with the center of the image plane set as an origin (0,0). The coordinates of blocks within the distance measuring area B are assumed to be (i,j). The vector of the optical flow in each block is assumed to be A(i,j). Further, the unit vector in the x direction is assumed to be "i" and the unit vector in the y direction to be "y". The optical flow vector can be rewritten as A(i,j)=iAx+jAy.

The displacement of the optical flow vector due to the expansion or contraction of the image means the divergence of vectors on the image plane. The divergence "divA" of the vector A can be expressed as follows:

$$divA = \frac{\partial Ax}{\partial x} + \frac{\partial Ay}{\partial y}$$

This divergence represents a change in distance between the object and the camera.

The restart determining circuit 78 obtains control information on the distance measuring area from the distance measuring area setting circuit 46 and also obtains information on movement vectors of each block of the image sensing plane from the movement vector detecting circuit 30. The restart determining circuit 46 computes and obtains the sum of "divA" as follows:

$$d = \sum_B divA$$

The sum of the divergence "divA" within the areas B changes according to the expansion or contraction of the object's image on the image sensing plane.

In the case of FIG. 9, the sum "d" becomes larger than zero as the image has expanded. If the object has moved away from the photo-taking lens 14, the sum becomes smaller than zero.

Therefore, if a state of "d=0" continues after attainment of an in-focus state, the distance to the object remains unchanged and the lens is left in repose. In a case where the sum "d" is not equal to 0 after attainment of the in-focus state, the distance between the camera and the object is regarded as changed and the automatic focusing device is restarted. In that case, the focus adjusting direction can be determined by the positive or negative value of the sum "d". More specifically, the object can be considered to have come closer to the photo-taking lens 14 if the sum "d" is larger than zero. In this instance, the focal point of the photo-taking lens 14 is in the rear of the object and there obtains the so-called far-focus state. If the sum "d" is less than zero, the object has moved farther away from the lens. In that instance, there obtains a near-focus state of the lens.

With the divergence "divA" of the optical flow vector within the distance measuring area examined in this manner, any change occurring in the object distance and the direction of the change can be accurately detected. This enables the automatic focusing device to be restarted as necessary after attainment of an in-focus state. Even in a case where the trial method is employed for the automatic focusing device, information on a near-focus or far-focus state can be accurately obtained without carrying out any trial action. The arrangement of this embodiment thus enables the automatic focusing device to be promptly, stably and accurately restarted.

Further, in accordance with the invention, a change in the object distance can be reliably detected by carrying out the statistical process on the movement vectors to compute the divergence of the optical flow vectors even in the event of a plurality of objects within the image sensing plane, a complex background or a hardly extractably image feature because of a slight difference in luminance, etc. The sensitivity and accuracy of the embodiment are thus arranged to be much higher than those of the conventional device.

In accordance with the arrangement of the embodiment of this invention as mentioned in the foregoing, the optical flow of the image plane is obtained by detecting the movement vectors for each of the plurality of blocks on the image sensing plane; the occurrence or nonoccurrence of any movement of the object is detected from the displacement of the optical flow; a discrimination is accurately made between an approaching movement and a departing movement; and the necessity for restart of an automatic focus adjusting action is determined on the basis of the information thus obtained. Therefore, unlike the conventional modulation method, the embodiment obviates the necessity of having recourse to a highly precise and complex mechanism for positively modulating the focus signal by creating an in-focus or out-of-focus state in obtaining information on a near-focus or far-focus state. The automatic focusing device according to this invention is thus arranged to be capable of accurately and precisely determining the necessity for a restart of focus adjusting action from the image signal through an efficient and stable operation.

What is claimed is:

1. An image processing device comprising:
    a) movement vector detecting means for detecting a movement vector of an image in an image signal output from an image sensing means in each of detection blocks formed by dividing an image sensing plane of said image sensing means;
    b) computing means for detecting a condition of an image movement in said image sensing plane by processing the movement vectors detected from said detection blocks;
    c) discrimination means for discriminating an area in which a main object is located or an area in which a background of said main object is located in said image sensing plane, on the basis of an output of said computing means; and
    d) correcting means for correcting the image movement caused by a movement of said device on the basis of a result of said discrimination means.

2. A device according to claim 1, wherein said movement vector detecting means is arranged to obtain said movement vector in each of said detection blocks on the basis of a variation of a luminance signal in each of said detection blocks on said image sensing plane between temporally different fields.

3. A device according to claim 2, wherein said computing means is arranged to obtain a distribution of movement vectors by preparing a histogram of movement vectors in said detection blocks in reference to a coordinate axis set on said image sensing plane, and to detect an area having an image movement above a predetermined threshold value and an area having an image movement below said threshold value.

4. A device according to claim 3, wherein said area discriminating means is arranged to determine said area having an image movement above said predetermined threshold value to be a position of an object to be photographed and said area having an image movement below said threshold value to be a background.

5. A device according to claim 4, further comprising:
    d) image shake detecting means for detecting a shake of an image on said image sensing plane on the basis of movement vectors in an area determined by said area discriminating means;
    e) compensating means for displacing an optical axis of an optical system which images an incident light on said image sensing plane; and
    f) control means for compensating for a shake of an image by controlling said compensating means in accordance with an output of said image shake detecting means.

6. A device according to claim 5, wherein said compensating means is a variable apex-angle prism.

7. A device according to claim 5, wherein said control means is arranged to determine said area having an image movement below said predetermined threshold value and corresponding to a background to be an image shake detection area, and to control said compensating means on the basis of the movement vectors in said area.

8. A device according to claim 4, herein said area having an image movement above said predetermined threshold value is used as an object tracing area.

9. A focus detecting area setting device, comprising:
    a) movement vector detecting means for detecting a movement vector of an image in an image signal output from an image sensing means in each of detection blocks formed by dividing an image sensing plane of said image sensing means;
    b) computing means for detecting a distributed condition of an image movement in said image sensing plane by processing the movement vectors obtained from each of said detection blocks;
    c) discriminating means for discriminating an area in which a main object to be photographed is located and the conditions of said main object in said image sensing Plane on the basis of an output of said computing means;
    d) setting means for setting a focus detecting area on the image sensing plane on the basis of the area detected by said discriminating means; and
    e) focusing means for focusing to said main object on the basis of the corresponding signal in said focus detecting area.

10. A device according to claim 9, wherein said movement vector detecting means is arranged to obtain said movement vector in each of said detection blocks on the basis of a variation of a luminance signal in each of said detection blocks on said image sensing plane between temporally different fields.

11. A device according to claim 10, wherein said computing means is arranged to obtain a distribution of movement vectors by preparing a histogram of movement vectors in said detection blocks in reference to a coordinate axis set on said image sensing plane, and to detect an area having an image movement above a predetermined threshold value and an area having an image movement below said threshold value.

12. A device according to claim 11, wherein said area discriminating means is arranged to determine said area having an image movement above said predetermined threshold value to be a position of an object to be photographed and said area having an image movement below said threshold value to be a background.

13. A device according to claim 12, further comprising:
   d) image shake detecting means for detecting a shake of an image on said image sensing plane on the basis of movement vectors in an area determined by said area discriminating means;
   e) compensating means for displacing an optical axis of an optical system which images an incident light on said image sensing plane; and
   f) control means for compensating for a shake of an image by controlling said compensating means in accordance with an output of said image shake detecting means.

14. A device according to claim 13, wherein said compensating means is a variable apex-angle prism.

15. A device according to claim 13, wherein said control means is arranged to determine said area having an image movement below said predetermined threshold value and to control said compensating means on the basis of the movement vectors in said area.

16. A device according to claim 12, wherein said area having an image movement above said predetermined threshold value is used as an object tracing area.

17. An automatic focusing device comprising:
   a) focus detecting means for detecting a degree of focusing on an object image in an image sensing plane of an image sensing means to make focus adjustment;
   b) movement vector detecting means for detecting a movement vector of the image obtained in each of detection blocks formed by dividing said image sensing plane;
   c) area detecting means for detecting an area having an image of the object by computing the movement vectors in said detection blocks to determine said area as a focus detection area; and
   d) control means for detecting a movement quantity of the image of the object on the basis of said movement vectors in said focus detection area detected by said area detecting means and for controlling said focus detecting means on the basis of said movement quantity.

18. A device according to claim 17, wherein said movement vector detecting means is arranged to obtain the movement vectors in each of said detection blocks on the basis of a luminance variation in each of said detection blocks on said image sensing plane between temporally different fields.

19. A device according to claim 18, wherein said area detecting means is arranged to obtain a distribution of movement vectors by preparing a histogram of movement vectors in said detection blocks in reference to a coordinate axis set on said image sensing plane, and to detect an area having an image movement above a predetermined threshold value and an area having an image movement below said threshold value.

20. A device according to claim 19, wherein said area detecting means is arranged to determine said area having an image movement above said predetermined threshold value to be an object position or a focus detection area and said area having an image movement below said threshold value to be a background.

21. A device according to claim 18 or 20, wherein said control means is arranged to operate said focus detecting means when the movement quantity of the image of the object in said focus detection area exceeds a predetermined value.

22. A device according to claim 21, wherein said control means is arranged to detect a change in a distance to an object on the basis of the magnitude of divergence of movement vectors in said focus detection area.

23. An automatic focusing device comprising:
   a) focus detecting means for detecting a degree of focusing on an object image in an image sensing plane of an image sensing means, on the basis of a high-frequency component of an image signal output from the image sensing means to make focus adjustment;
   b) movement vector detecting means for detecting a movement vector of an image in each of detection blocks formed by dividing said image sensing plane;
   c) area detecting means for detecting an area having an image of the object on the basis of the movement vector in each of said detection blocks to determine said area to be a focus detection area; and
   d) control means for detecting a movement quantity of the image of the object by computing the movement vector in said focus detection area detected by said area detecting means and for starting to operate said focus detecting means when said movement quantity exceeds a predetermined threshold value.

24. An image processing device, comprising:
   a) movement vector detecting means for detecting movement vectors at a plurality of positions on an image sensing plane, respectively, from within an image signal output from image sensing means;
   b) computing means for computing the movement vectors at said plurality of positions detected by said movement vector detecting means and for detecting a movement of the device;
   c) shifting correcting means for cancelling a movement of an image owing to the moving of the device, on the basis of an output of said computing means without moving said device; and
   d) focus control means for detecting and controlling a focus condition on the basis of a predetermined signal component in the image signal and the movement vector output from said computing means.

25. A device according to claim 24, wherein said computing means is arranged to be able to discriminate between a shake of the device and a panning of said device, on the basis of an output of said vector detecting means.

26. A device according to claim 25, wherein said shake correcting means is arranged to detect a shake from an area on said image sensing plane in which a moving area of said object is located when the shake of the device is being detected by said computing means, and to correct said detected shake.

27. A device according to claim 25, wherein said shake correcting means is arranged to stop the shake correcting operation when the panning is detected by said computing means.

28. A video camera, comprising:
 a) movement vector detecting means for detecting movement vectors on a plurality of detection blocks set on an image sensing plane, on the basis of an image signal output from an image sensing means;
 b) discrimination means for discriminating an area in which a main object to be photographed is located on an area in which a background of said main object is located, on the basis of computation of the movement vectors on said respective detection blocks detected by said movement vector detecting means; and
 c) shake correcting means for detecting a shake of said video camera, on the basis of the movement vector in the area where the background of the main object is located, which has been discriminated by said discrimination means, and for correcting said detected shake of said video camera, without moving said video camera.

29. A video camera according to claim 28, wherein said shake correcting means includes means arranged to effect shake correction on the basis of the movement vector in the area where said background is located, when it has been discriminated on the basis of said discrimination means that there is a movement in the area where the main object is located while there is not substantial movement in the area where said background is located, and to set a focus detecting area at the position of said main object, when there is a movement of only said main object.

30. A video camera according to claim 29, further comprising:
 focus adjusting means for detecting a focusing degree on the basis of a predetermined component in an image signal corresponding to said focus detecting area and then effecting a focus detection.

31. A video camera according to claim 30, wherein said focus adjusting means is arranged to start its operation, depending upon a change of said main object area.

32. A video camera, comprising:
 a) movement vector detecting means for detecting movement vectors at a plurality of positions on an image sensing plane of an image sensing means, on the basis of image signals output in a time series;
 b) discrimination means for discriminating a condition of movement of an image on said image sensing plane, on the basis of a state of distribution, on said image sensing plane, of the respective movement vectors detected by said movement vector detecting means, said discrimination means being capable of discriminating among a movement of an object only, a shake of the camera and a panning; and
 c) area control means for deciding a position, on said image sensing plane, of a shake detecting area for effecting a shake corrections on the basis of an output of said discrimination means.

33. An image processing device comprising:
 a) movement vector detecting means for detecting a movement vector of an image signal output from an image sensing means in each of detection blocks formed by dividing an image sensing plane of said image sensing means;
 b) computing means for computing the movement vectors respectively detected in said detection blocks in said image sensing plane to obtain a representative movement vector corresponding to a movement of an image in said image sensing plane on the basis of a relative movement between said image processing device and a main object in said image sensing plane;
 c) compensating means for compensating the movement of an image in said image sensing plane on the basis of the relative movement between said image processing device and said main object according to said representative movement vector so that said representative movement vector is diminished, without a moving of said device; and
 d) focus adjusting means for adjusting a focus state of said image in said image sensing plane.

34. A device according to claim 33, further comprising:
 a) a photographing lens optical system including a focusing lens; and
 b) a shake correcting optical system.

35. A device according to claim 34, wherein said focus adjusting means is arranged to control said focusing lens to its in-focus point on the basis of a predetermined focusing signal extracted from said image signal.

36. A device according to claim 34, wherein said shake correcting optical system is a variable apex angle prism.

37. A device according to claim 36, wherein said variable apex angle prism is arranged at a forward end of said photographing lens optical system.

38. A device according to claim 33, wherein said movement vector detecting means is arranged to obtain said movement vector in each of said detection blocks on the basis of a variation of a luminance signal variation in each of said detection blocks on said image sensing plane between temporally different fields.

39. A device according to claim 38, wherein said computing means is arranged to obtain a distribution of movement vectors by preparing a histogram of movement vectors in said detection blocks in reference to a coordinate axis set on said image sensing plane, and to detect an area having an image movement above a predetermined threshold value and an area having an image movement below said threshold value.

40. A device according to claim 33, wherein said vector detecting means is arranged to detect the movement vector on the basis of a variation of the luminance signal component included in said image signal.

41. A video camera apparatus comprising:
 a) image sensing means for converting an image of an object formed on an image sensing plane to an image signal;
 b) movement vector detecting means for detecting a plurality of movement vectors in the image signal output from said image sensing means in a plurality of detection blocks formed by dividing said image sensing plane;
 c) computing means for computing the movement vectors detected by said movement vector detecting means to obtain a representative movement vector corresponding to a movement of said image in said image sensing plane caused by a relative movement between said video camera apparatus and said object;
 d) compensating means for compensating the movement of said image in said image sensing plane so as to diminish said representative movement vector, without a moving of said video camera apparatus; and
 e) focus adjusting means for adjusting a focus state of said image in said image sensing plane.

42. Apparatus according to claim 41, further comprising:
f) a photographing lens optical system including a focusing lens; and
g) a shake correcting optical system.

43. An apparatus according to claim 42, wherein said focus adjusting means is arranged to control said focusing lens to its in-focus point on the basis of a predetermined focusing signal extracted from said image signal.

44. An apparatus according to claim 42, wherein said shake correcting optical system is a variable apex angle prism.

45. A video processing apparatus comprising:
a) receiving means for receiving an image signal corresponding to an image on an image sensing plane;
b) movement vector detecting means for detecting a plurality of movement vectors in the image signal receiving means in a plurality of detecting blocks defined by dividing said image sensing plane;
c) computing means for computing the movement vectors detected by said movement vector detecting means to obtain a representative movement vector of said image in said image sensing plane;
d) compensating means for compensating a movement of said image in said image sensing plane so as to diminish said representative movement vector, without a moving of said video processing apparatus; and
e) focus control means for detecting and controlling a focus condition relative to said image on the basis of the image signal and an output of said computing means.

46. An apparatus according to claim 45, further comprising a photographing lens optical system including a focusing lens and a shake correcting optical system.

47. An apparatus according to claim 46, wherein said focus detecting means is arranged to control said focusing lens to its in-focus point on the basis of a predetermined focusing signal extracted from said image signal.

48. An apparatus according to claim 46, wherein said shake correcting optical system is a variable apex prism.

49. An apparatus according to claim 45, wherein said receiving means includes a CCD or like image sensing element.

50. An image processing device comprising:
a) movement vector detecting means for detecting a movement vector of an image in an image signal output from an image sensing means in each of detection blocks formed by dividing an image sensing plane of said image sensing means;
b) computing means for detecting a condition of an image movement in said image sensing plane by processing the movement vectors detected from said detection blocks;
c) discrimination means for discriminating an area suitable for detecting an image movement caused by a movement of said device on the basis of an output of said computing means; and
d) correcting means for correcting the image movement caused by the movement of said device on the basis of a result of said discrimination means.

51. A device to claim 50, wherein said movement vector detecting means is arranged to obtain said movement vector in each of said detection blocks on the basis of a variation of a luminance signal in each of said detection blocks on said image sensing plane between temporally different fields.

52. A device according to claim 51, wherein said computing means is arranged to obtain a distribution of movement vectors by preparing a histogram of movement vectors in said detection blocks in reference to a coordinate axis set on said image sensing plane, and to detect an area having an image movement above a predetermined threshold value and an area having an image movement below said threshold value.

53. A device according to claim 52, wherein said area discriminating means is arranged to determine said area having an image movement above said predetermined threshold value to be a position of an object to be photographed and said area having an image movement below said threshold value to be a background.

54. A device according to claim 53, further comprising:
d) image shake detecting means for detecting a shake of an image on said image sensing plane on the basis of movement vectors in an area determined by said area discriminating means;
e) compensating means for displacing an optical axis of an optical system which images an incident light on said image sensing plane; and
f) control means for compensating for a shake of an image by controlling said compensating means in accordance with an output of said image shake detecting means.

55. A device according to claim 54, wherein said compensating means is a variable apex-angle prism.

56. A device according to claim 54, wherein said control means is arranged to determine said area having an image movement below said predetermined threshold value and corresponding to a background to be an image shake detection area, and to control said compensating means on the basis of the movement vectors in said area.

57. A device according to claim 53, wherein said area having an image movement above said predetermined threshold value is used as an object tracing area.

58. A device according to claim 23, wherein said movement vector detecting means is arranged to obtain said movement vector in each of said detection blocks on the basis of a variation of a luminance signal in each of said detection blocks on said image sensing plane between temporally different fields.

59. A device according to claim 10, wherein said control means is arranged to compute a divergence of movement vectors in said focus detection area.

60. A camera according to claim 32, further comprising:
d) a shake correcting device for performing the shake corrections according to the movement vector in said shake detecting area.

61. A camera according to claim 60, wherein said shake detecting device having a shake correcting optical system.

62. A camera according to claim 61, wherein said shake correcting optical system is a variable apex prism.

63. A camera according to claim 32, wherein said movement vector detecting means is arranged to obtain said movement vector in each of said detection blocks on the basis of a variation of a luminance in each of said detection blocks on said image sensing plane between temporally different fields.

64. An image processing apparatus comprising:
a) image receiving means for receiving an image signal corresponding to an image on an image plane;
b) movement vector detecting means for detecting a plurality of movement vectors in the image signal output from said image receiving means in a plurality of detection blocks formed by dividing said image plane;
c) computing means for computing the movement vectors detected by said movement vector detecting means to determine a detection area to obtain a representative movement vector corresponding to a movement of said image in said image plane caused by a relative movement between said apparatus and said object; and d) compensating means for compensating the movement of said image in said image sensing plane so as to diminish said representative movement vector, without a moving of said apparatus.

65. Apparatus according to claim 64, further comprising:

e) focus adjusting means for adjusting a focus state of said image in said image sensing plane;

f) a photographing lens optical system including a focusing lens; and g) a shake correcting optical system.

66. An apparatus according to claim 65, wherein said focus adjusting means is arranged to control said focusing lens to its in-focus point on the basis of a predetermined focusing signal extracted from said image signal.

67. An apparatus according to claim 65, wherein said shake correcting optical system is a variable apex angle prism.

* * * * *

UNITED STATES PATENT AND TRADEMARK OFFICE
CERTIFICATE OF CORRECTION

PATENT NO. : 5,949,481
DATED : September 7, 1999
INVENTOR(S) : Masayoshi Sekine, et al.

It is certified that error appears in the above-identified patent and that said Letters Patent is hereby corrected as shown below:

Abstract, line 1, delete "sensing an" and insert -- sensing and --.
Col. 4, line 9, delete "condition." and insert -- conditions. --.
Col. 4, line 13, delete "Jun. 30;, 1986" and insert -- Jun. 30, 1986 --.
Col. 5, line 13, delete "far-near" and insert -- "far-near --.
Col. 8, line 14, delete "sec:" and insert -- sec. --.
Col. 9, line 7, delete "msec" and insert -- msec. --.
Col. 9, line 7, delete "sec," and insert -- sec. --.
Col. 10, line 7, delete "find a widely" and insert -- find widely --.
Col. 13, line 17, delete "THx1" and insert -- Thx1 --.
Col. 15, line 8, delete "that: In" and insert -- that in --.
Col. 20, line 60, delete "Plane" and insert -- plane --.

Signed and Sealed this

Twenty-eighth Day of November, 2000

Attest:

Q. TODD DICKINSON

*Attesting Officer*                *Director of Patents and Trademarks*